US010457346B2

(12) United States Patent
Araki et al.

(10) Patent No.: US 10,457,346 B2
(45) Date of Patent: Oct. 29, 2019

(54) VEHICLE

(71) Applicant: HONDA MOTOR CO., LTD., Tokyo (JP)

(72) Inventors: Makoto Araki, Wako (JP); Takashi Kudo, Wako (JP); Toru Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 15/847,328

(22) Filed: Dec. 19, 2017

(65) Prior Publication Data

US 2018/0178873 A1 Jun. 28, 2018

(30) Foreign Application Priority Data

Dec. 27, 2016 (JP) ................................. 2016-254458

(51) Int. Cl.
*B62K 21/02* (2006.01)
*B62K 21/10* (2006.01)
(Continued)

(52) U.S. Cl.
CPC ............. *B62K 21/10* (2013.01); *B62K 11/04* (2013.01); *B62K 21/02* (2013.01); *B62K 25/08* (2013.01);
(Continued)

(58) Field of Classification Search
CPC ........ B62K 11/04; B62K 21/10; B62K 25/08; B62K 21/02; B62K 2025/045; B62K 2025/044
(Continued)

(56) References Cited

U.S. PATENT DOCUMENTS

| 4,624,470 A | * | 11/1986 | Love | ...................... B62K 21/00 180/219 |
| 5,967,538 A | * | 10/1999 | Callaluca | ............... B62K 21/00 180/219 |

(Continued)

FOREIGN PATENT DOCUMENTS

| DE | 9412644 U1 | 10/1994 |
| FR | 2744980 A1 | 8/1997 |

(Continued)

OTHER PUBLICATIONS

Extended European Search Report for Application No. 17207596.2, dated Jun. 6, 2018.

(Continued)

*Primary Examiner* — Toan C To
(74) *Attorney, Agent, or Firm* — Birch, Stewart, Kolasch & Birch, LLP

(57) ABSTRACT

A vehicle includes a vehicle body, a front wheel that is disposed anterior to the vehicle body and that is steerable about a steering axis, and a front fork that supports the front wheel. The vehicle body includes a vehicle body frame and a steering rotation unit that is supported on the vehicle body frame and that rotates about the steering axis. The vehicle includes a variable trail length mechanism. The variable trail length mechanism includes an oscillation shaft that extends in a vehicle width direction to thereby connect the front fork oscillatably with the steering rotation unit. The oscillation shaft is disposed at a position overlapping an axis of the front fork in a vehicle side elevational view.

7 Claims, 19 Drawing Sheets

(51) Int. Cl.
 *B62K 25/08* (2006.01)
 *B62K 11/04* (2006.01)
 *B62K 25/04* (2006.01)
(52) U.S. Cl.
 CPC .. *B62K 2025/044* (2013.01); *B62K 2025/045* (2013.01)
(58) Field of Classification Search
 USPC .................................. 180/219, 233; 280/279
 See application file for complete search history.

(56) References Cited

U.S. PATENT DOCUMENTS

| | | | | |
|---|---|---|---|---|
| 7,438,306 | B2* | 10/2008 | Mrdeza | B62K 21/04 280/274 |
| 8,181,981 | B2* | 5/2012 | Stenberg | B62K 11/04 180/219 |
| 8,272,460 | B2* | 9/2012 | Song | B62J 27/00 180/219 |
| 9,868,488 | B2* | 1/2018 | Hackl | B62K 21/22 |
| 2006/0022427 | A1 | 2/2006 | Grant | |
| 2009/0212525 | A1 | 8/2009 | Clari | |
| 2014/0265224 | A1 | 9/2014 | Takenaka et al. | |
| 2014/0367942 | A1* | 12/2014 | Nesbitt, III | B62K 25/24 280/276 |
| 2016/0375948 | A1* | 12/2016 | Takenaka | B62K 5/10 280/5.506 |
| 2018/0178871 | A1* | 6/2018 | Ito | B62K 25/08 |
| 2018/0178872 | A1* | 6/2018 | Araki | B62K 25/08 |
| 2018/0178875 | A1* | 6/2018 | Araki | B62K 11/04 |

FOREIGN PATENT DOCUMENTS

| | | |
|---|---|---|
| JP | 2004-284218 A | 10/2004 |
| JP | 2010-172622 A | 8/2010 |
| JP | 2014-172586 A | 9/2014 |

OTHER PUBLICATIONS

European Office Action for European Application No. 17207596.2, dated Mar. 29, 2019.
Japanese Office Action, dated Nov. 13, 2018, for Japanese Application No. 2016-254458, along with a English machine translation.
Japanese Office Action for Japanese Application No. 2016-254458, dated Jun. 4, 2019, with English translation.

\* cited by examiner

FIG.4A
FIG.4B
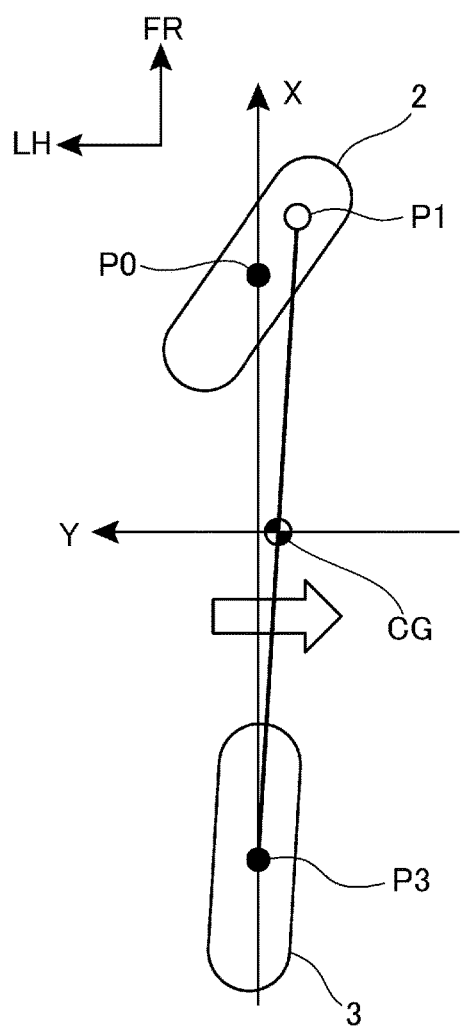
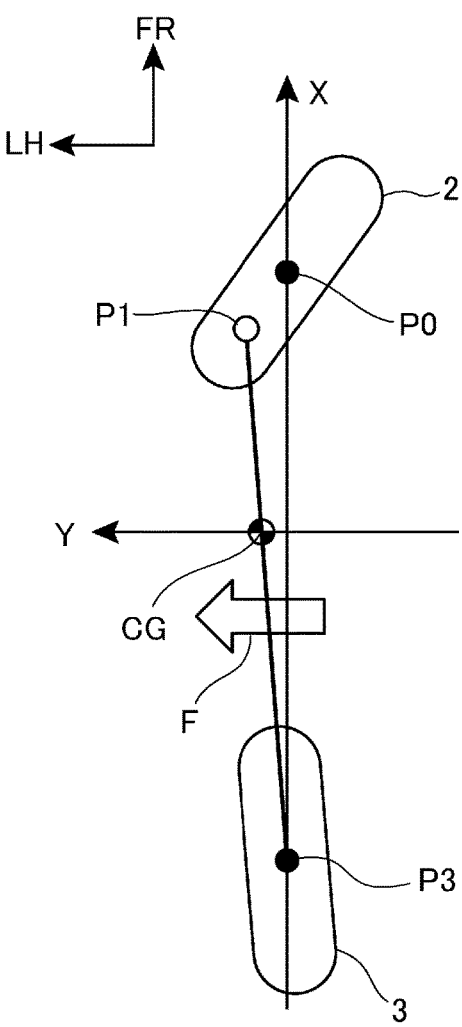

VEHICLE

INCORPORATION BY REFERENCE

The present application claims priority under 35 U.S.C. § 119 to Japanese Patent Application No. 2016-254458 filed on Dec. 27, 2016. The content of the application is incorporated herein by reference in its entirety.

TECHNICAL FIELD

The present invention relates to a vehicle.

BACKGROUND ART

A known vehicle includes a variable trail length mechanism that varies a trail length of a front wheel that is disposed anterior to a vehicle body and is steerable about a steering axis, in addition to, as the vehicle body, a vehicle body frame and a steering rotation unit that is supported on the vehicle body frame to rotate about a steering axis, and a front wheel support member that supports the front wheel (see, for example, Patent Document 1). The arrangement disclosed in Patent Document 1 includes the oscillation unit that is formed into a frame shape to support upper portions of the front forks and that is oscillatably connected with a front end portion of an upper portion of the steering rotation unit.

PRIOR ART DOCUMENT

Patent Document

Patent Document 1

Japanese Patent Laid-open No. 2014-172586

SUMMARY OF THE INVENTION

Problem to be Solved by the Invention

In the known vehicle, however, the center of oscillation of the oscillation unit is spaced away from the front forks. This increases inertia weight at the time of changing the trail length by oscillating the front forks integrally with the oscillation unit, thus tending to require a large driving force for changing the trail length.

The present invention has been made in view of the foregoing situation and it is an object of the present invention to enable, in a vehicle including a variable trail length mechanism, a trail length to be changed easily.

Means for Solving the Problem

One aspect of the present invention provides a vehicle including a vehicle body (10, 210, 310), a front wheel (2) that is disposed anterior to the vehicle body (10, 210, 310) and that is steerable about a steering axis (Cs), and a front fork (25L, 25R) that supports the front wheel (2), the vehicle body (10, 210, 310) including a vehicle body frame (11) and a steering rotation unit (13, 313, 413) that is supported on the vehicle body frame (11) and that rotates about the steering axis (Cs). Further, the vehicle includes: a variable trail length mechanism (30, 330, 430) that varies a trail length (t) of the front wheel (2), the variable trail length mechanism (30, 330, 430) including an oscillation shaft (48, 348, 448) that extends in a vehicle width direction to thereby connect the front fork (25L, 25R) oscillatably with the steering rotation unit (13, 313, 413). Still further, the oscillation shaft (48, 348, 448) is disposed at a position overlapping an axis (25a) of the front fork (25L, 25R) in a vehicle side elevational view.

In the aspect of the present invention, preferably, the oscillation shaft (48) is disposed at an upper end portion of the front fork (25L, 25R).

In the aspect of the present invention, preferably, the front fork (25L, 25R) has a fork cap (25d) that closes an upper surface of the front fork (25L, 25R), and the oscillation shaft (48) is disposed in the fork cap (25d).

In the aspect of the present invention, preferably, the steering rotation unit (13) includes a steering shaft (32) journaled by a head pipe (17) of the vehicle body frame (11), a top bridge (33) fixed to an upper end portion of the steering shaft (32), and a bottom member (34) fixed to a lower end portion of the steering shaft (32). Further, preferably, the variable trail length mechanism (30) includes a drive source (42) and a linkage mechanism (47) that connects the front fork (25L, 25R) with the bottom member (34) and that oscillates the front fork (25L, 25R) through a driving force of the drive source (42), and the oscillation shaft (48) is supported by the top bridge (33).

In the aspect of the present invention, preferably, the steering rotation unit (313, 413) includes a steering shaft (32) journaled by a head pipe (17) of the vehicle body frame (11), a top bridge (333, 433) fixed to an upper end portion of the steering shaft (32), and a bottom member (334, 434) fixed to a lower end portion of the steering shaft (32), and the oscillation shaft (348, 448) is disposed at, in a side elevational view, a position overlapping the axis (25a) and closer to the bottom member (334, 434) than to the top bridge (333, 433).

In the aspect of the present invention, preferably, the vehicle further includes a bottom bridge (349) that connects a left and right pair of the front forks (25L, 25R), and the oscillation shaft (348) is disposed in the bottom bridge (349) at a position overlapping the axis (25a) in a side elevational view.

In the aspect of the present invention, preferably, the front fork (25L, 25R) constitutes an electronic control suspension capable of changing an axial length of the front fork, and the vehicle further includes a control apparatus (83) that drives the electronic control suspension so as to minimize a change in a vehicle height corresponding to the change in the vehicle height by an operation of the variable trail length mechanism (30, 330, 430).

Effects of the Invention

In the vehicle in accordance with the aspect of the present invention, the vehicle body includes the vehicle body frame and the steering rotation unit that is supported on the vehicle body frame and rotates about the steering axis. The variable trail length mechanism includes the oscillation shaft that extends in the vehicle width direction to thereby connect the front fork oscillatably with the steering rotation unit. The oscillation shaft is disposed at a position overlapping the axis of the front fork in a vehicle side elevational view. Through the foregoing arrangement, the front fork oscillates about the oscillation shaft disposed at the position overlapping the axi of the front fork, so that inertia weight at the time of changing the trail length by oscillating the front fork can be reduced. Thus, the trail length can be easily changed using the variable trail length mechanism.

In accordance with the aspect of the present invention, the oscillation shaft may be disposed at the upper end portion of the front fork. This arrangement enables an effective use of a space at the upper end portion of the front fork in disposing the oscillation shaft compactly. The arrangement further eliminates the need for allocating a space for the front fork to oscillate at a position superior to the oscillation shaft, thus offering a high degree of freedom in disposing parts.

In accordance with the aspect of the present invention, the front fork may have the fork cap that closes the upper surface of the front fork and the oscillation shaft may be disposed in the fork cap. The foregoing arrangement allows the oscillation shaft to be disposed using a simple structure of the fork cap.

In accordance with the aspect of the present invention, the variable trail length mechanism may include the drive source and the linkage mechanism that connects the front fork with the bottom member and that oscillates the front fork through the driving force of the drive source, and the oscillation shaft may be supported by the top bridge. The foregoing arrangement allows the front fork supported by the oscillation shaft of the top bridge to be oscillated via the linkage mechanism connected with the bottom member, specifically, the front fork can be oscillated by a compact structure to thereby change the trail length.

In accordance with the aspect of the present invention, the oscillation shaft may be disposed at, in a side elevational view, a position overlapping the axis and closer to the bottom member than to the top bridge. This arrangement causes the front fork to oscillate about the oscillation shaft disposed at a position closer to the bottom member, so that a change in vehicle height when the trail length is changed by the variable trail length mechanism can be minimized.

In accordance with the aspect of the present invention, the vehicle may further include the bottom bridge that connects a left and right pair of the front forks, and the oscillation shaft may be disposed in the bottom bridge at a position overlapping the axis in a side elevational view. This arrangement allows the oscillation shaft to be provided using a simple structure including the bottom bridge that enhances stiffness of the front forks.

In accordance with the aspect of the present invention, the front fork may constitute an electronic control suspension capable of changing the axial length of the front fork and the vehicle may further include the control apparatus that drives the electronic control suspension so as to minimize a change in the vehicle height corresponding to the change in the vehicle height by an operation of the variable trail length mechanism. The foregoing arrangement allows a change in the vehicle height to be minimized even when the trail length is changed by the variable trail length mechanism. Alternatively, the vehicle height while the vehicle is stationary may be lowered by the electronic control suspension to thereby improve a property with which the operator (rider) can put both feet on the ground.

BRIEF DESCRIPTION OF THE DRAWINGS

FIGS. 4A and 4B are schematic views depicting a relation between a steering direction of a front wheel and a position of a center of gravity of the vehicle.

MODES FOR CARRYING OUT THE INVENTION

Figure 1:
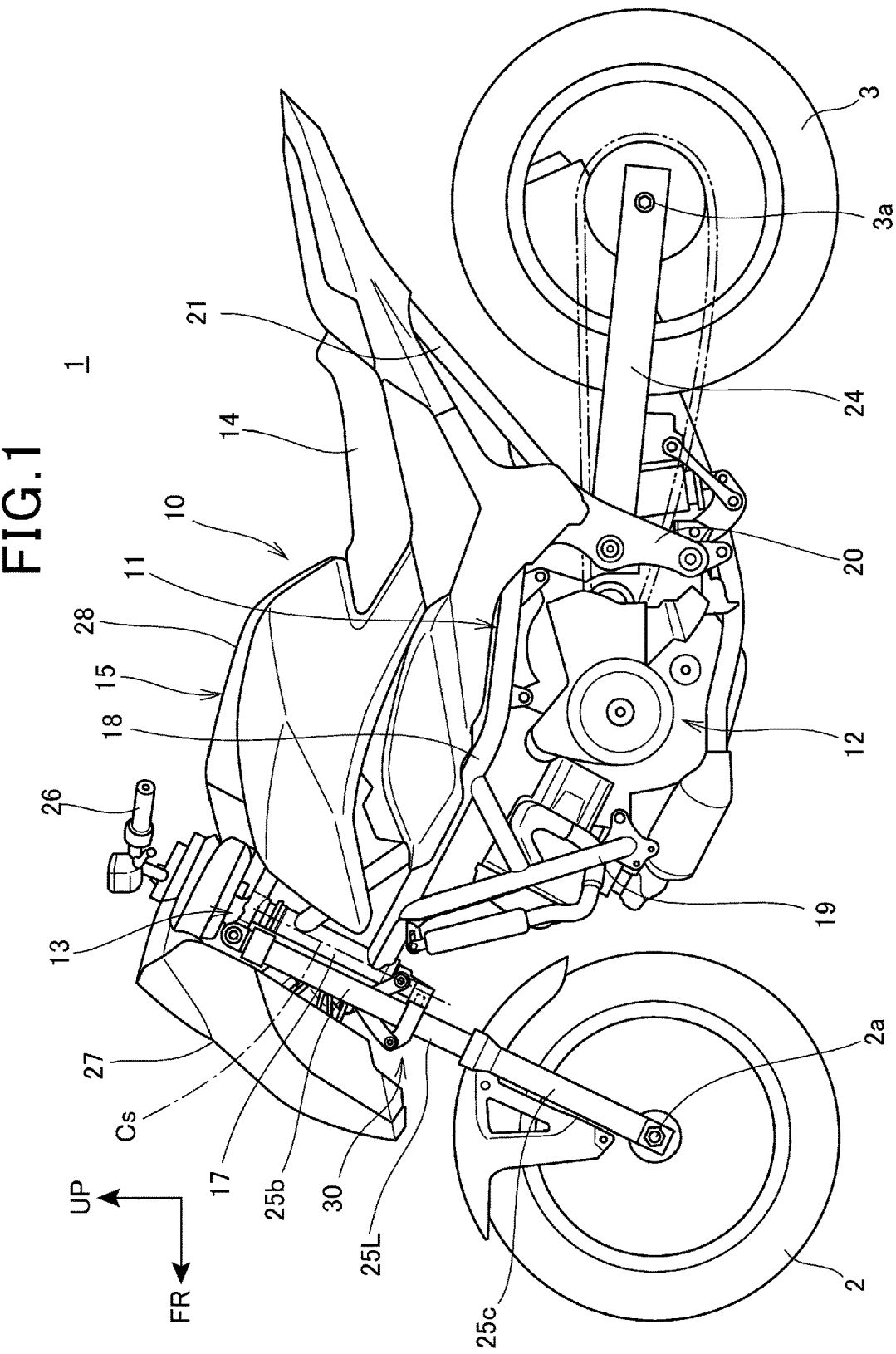
FIG. 1 is a left side elevational view depicting a vehicle according to a first embodiment of the present invention.

Specific embodiments to which the present invention is applied will be described below with reference to the accompanying drawings. Throughout the descriptions given hereunder, longitudinal, lateral, and vertical directions are relative to the vehicle body unless otherwise specified. In the drawings, an arrow FR denotes a vehicle forward direction, an arrow UP denotes a vehicle upward direction, and an arrow LH denotes a vehicle leftward direction.

First Embodiment

FIG. 1 is a left side elevational view depicting a vehicle according to a first embodiment of the present invention.

This vehicle 1 is a motorcycle that includes a vehicle body 10, a front wheel 2 disposed anterior to the vehicle body 10, and a rear wheel 3 disposed posterior to the vehicle body 10.

The vehicle body 10 includes a vehicle body frame 11, an engine 12, a steering rotation unit 13, a seat 14, and a vehicle body cover 15. The engine 12 serves as a traveling power unit supported on the vehicle body frame 11. The steering rotation unit 13 rotates about a steering axis Cs at a front end portion of the vehicle body frame 11. An operator sits in the seat 14. The vehicle body cover 15 covers, for example, the vehicle body frame 11. The vehicle 1 is a saddled vehicle in which the operator straddles the seat 14. The rear wheel 3 is a drive wheel driven by a driving force of the engine 12. It is noted that a motor for driving the front wheel 2 may be incorporated in a wheel of the front wheel 2 to make the front wheel 2 a drive wheel.

The vehicle body frame 11 includes a head pipe 17, a main frame 18, a down frame 19, a pivot frame 20, and a seat frame 21. The head pipe 17 is disposed at a front end portion of the vehicle body frame 11 and journals the steering rotation unit 13. The main frame 18 extends downwardly toward the rear from the head pipe 17. The down frame 19 extends downwardly from a front portion of the main frame 18. The pivot frame 20 extends downwardly from a rear portion of the main frame 18. The seat frame 21 extends toward the rear from an upper portion of the pivot frame 20.

The head pipe 17 is a tubular member disposed to be inclined rearwardly with respect to a vertical direction in a side elevational view. As with the front wheel 2 and the rear wheel 3, the head pipe 17 is disposed at a center in a vehicle width direction (lateral direction) of the vehicle 1. The steering axis Cs is aligned with an axis of the head pipe 17.

The vehicle 1 further includes front forks 25L and 25R (front wheel support members) and a swing arm 24. The front forks 25L and 25R are supported by the steering rotation unit 13 and extend downwardly toward the front. The swing arm 24 extends rearwardly from the pivot frame 20 to support the rear wheel 3. The rear wheel 3 is journaled on an axle 3a disposed at a rear end portion of the swing arm 24.

The front forks 25L and 25R are provided in pairs on both lateral sides of the front wheel 2. The front wheel 2 is journaled on an axle 2a that is disposed at lower end portions of the front forks 25L and 25R and that extends in the vehicle width direction.

Figure 5:
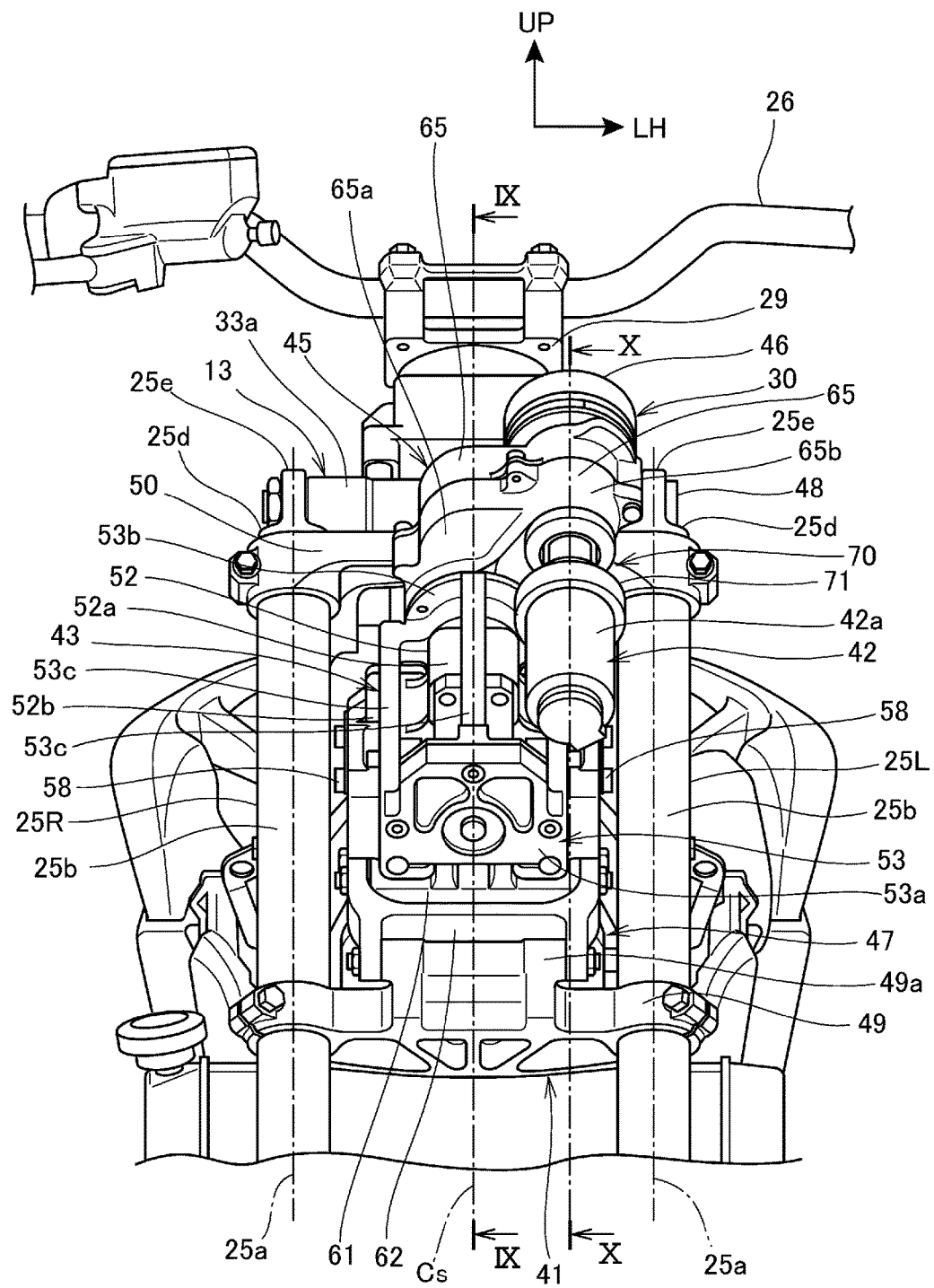
FIG. 5 is a front elevational view depicting a front portion of the vehicle as viewed from the front.

The front forks 25L and 25R rotate integrally with the steering rotation unit 13. A steering handlebar 26 to be operated by the operator is disposed at an upper portion of the steering rotation unit 13 via a handlebar support member 29 (FIG. 5). Specifically, when the operator turns the steering handlebar 26, the steering rotation unit 13 rotates about the steering axis Cs and the front wheel 2 is steered to the left or right.

The vehicle body cover 15 includes a front cover 27 and a tank cover 28. The front cover 27 is disposed anterior to the head pipe 17. The tank cover 28 covers a portion between the head pipe 17 and the seat 14.

Basic technical aspects relating to the first embodiment will be described below with reference to FIGS. 2 to 4B.

Figure 2:
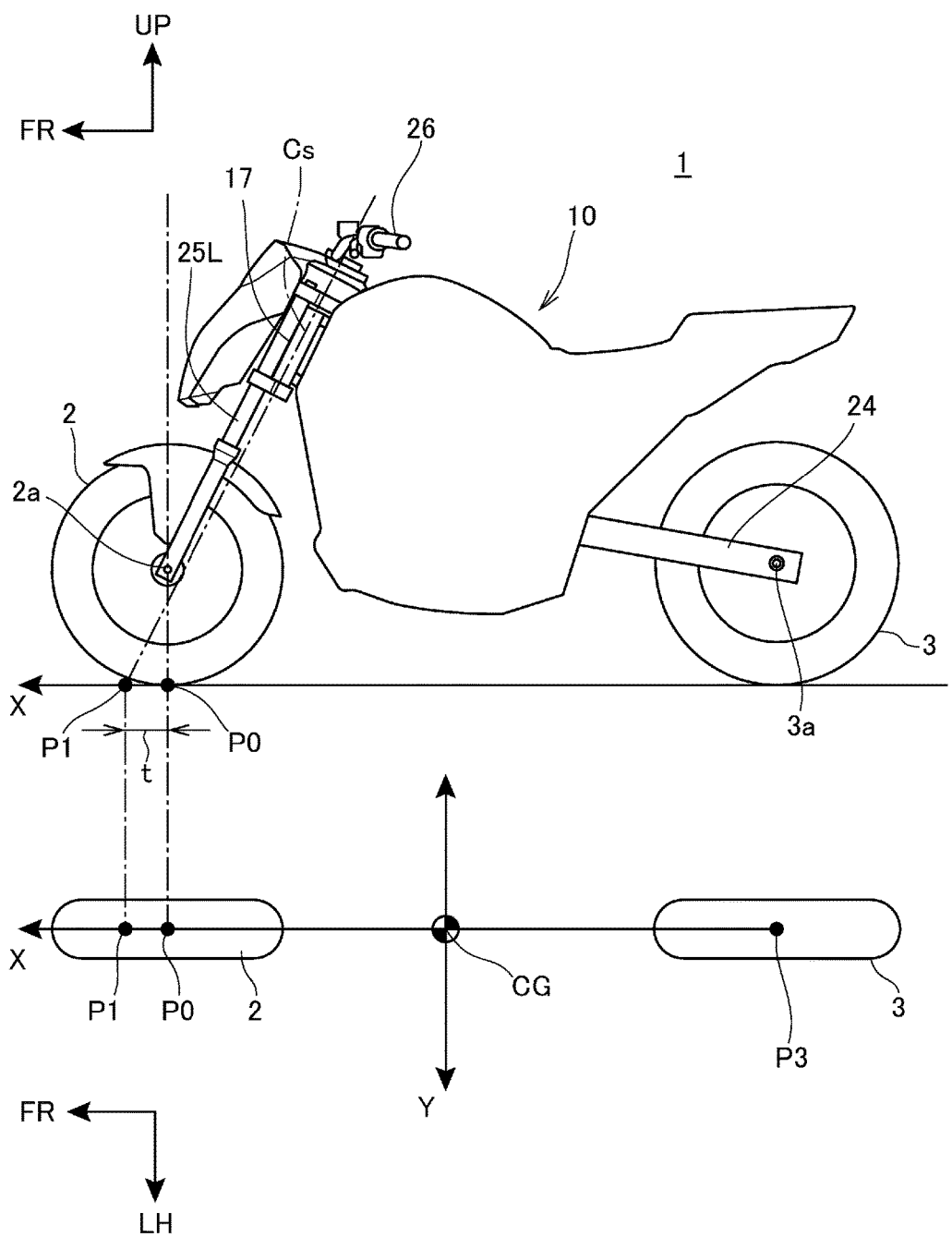
FIG. 2 is a left side elevational view depicting the vehicle in which a trail length is positive.
Figure 3:
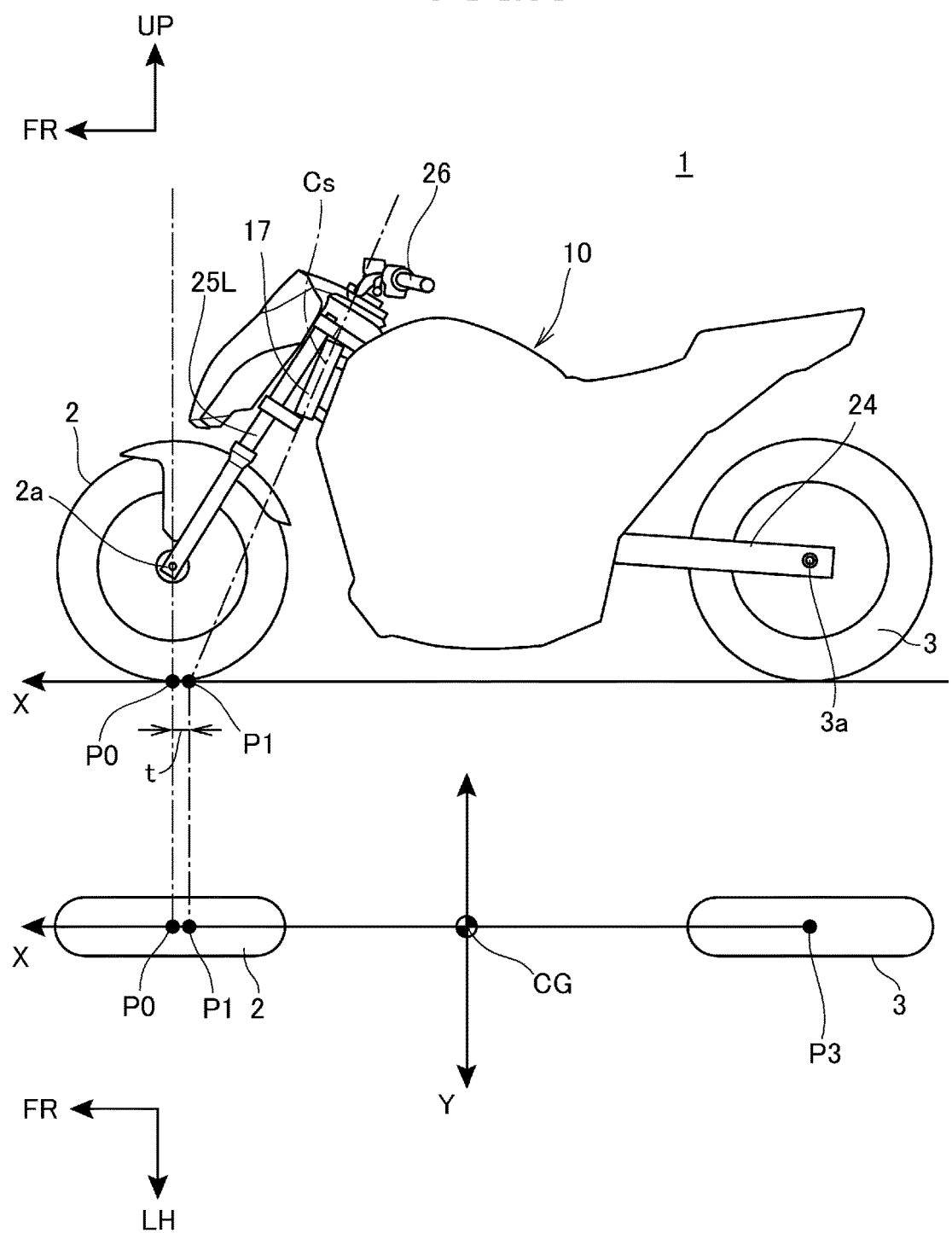
FIG. 3 is a left side elevational view depicting the vehicle in which a trail length is negative.

FIG. 2 is a left side elevational view depicting the vehicle 1 in which a trail length is positive. FIG. 3 is a left side elevational view depicting the vehicle 1 in which the trail length is negative. FIGS. 4A and 4B are schematic views depicting a relation between a steering direction of the front wheel 2 and a position of a center of gravity of the vehicle 1. In FIGS. 2 and 3, the position of the center of gravity of the vehicle 1, for example, is depicted in the lower half of the respective figures. In FIGS. 2 to 4B, a direction X indicates a fore-aft direction of the vehicle 1 and a direction Y indicates a roll direction (axial direction about the axis of the direction X) of the vehicle 1. It is noted that the vehicle forward direction FR is disposed on the direction X and the vehicle leftward direction LH is disposed on the direction Y.

FIGS. 2 and 3 depict a reference position state in which the vehicle 1 assumes an erect upright position and a steering angle of the front wheel 2 is 0(°).

A trail length t is a distance between a ground contact point P0 of the front wheel 2 and a ground contact point P1 of the steering axis Cs under the reference position state. The trail length t is positive on the forward side with reference to the ground contact point P0 and negative on the rearward side with reference to the ground contact point P0. The ground contact point P0 of the front wheel 2 is disposed directly below the axle 2a. A ground contact point P3 of the rear wheel 3 is disposed directly below the axle 3a.

FIG. 2 depicts that the ground contact point P1 of the steering axis Cs is disposed anterior to the ground contact point P0 of the front wheel 2 and the trail length t is a positive value. FIG. 3 depicts that the ground contact point P1 of the steering axis Cs is disposed posterior to the ground contact point P0 of the front wheel 2 and the trail length t is a negative value.

When the front forks 25L and 25R are leaned further backward with respect to the steering axis Cs from the state depicted in FIG. 2, the ground contact point P0 of the front wheel 2 moves forward, resulting in a negative trail length t as depicted in FIG. 3.

It is here noted that the state in which the trail length t is positive as depicted in FIG. 2 is referred to as an "ordinary state" and the state in which the trail length t is negative as depicted in FIG. 3 is referred to as a "trail length changed state." Specifically, the "trail length changed state" is a state in which the front forks 25L and 25R are leaned backward with respect to the vehicle body 10 from the "ordinary state."

As depicted in FIGS. 2 and 3, under the reference position state, the center of gravity CG of the vehicle 1 is disposed at the center in the vehicle width direction of the vehicle 1 and between the front wheel 2 and the rear wheel 3.

While the vehicle 1 is traveling, the front wheel 2 rolls to move the ground contact point to a steered direction (direction in which the wheel is steered). As a result, force is generated in a direction opposite to the steered direction with respect to the center of gravity CG. Specifically, steering in the direction in which the vehicle body collapses generates force in the direction in which the vehicle body stands upright.

When the vehicle 1 is stationary, in contrast, steering the front wheel 2 under the "ordinary state" (steered to the right in FIG. 4A) causes the center of gravity CG of the vehicle 1 to move in a direction (rightward) identical to the steered direction as depicted in FIG. 4A. Thus, when the vehicle 1 is stationary under the "ordinary state," steering in the direction in which the vehicle body collapses generates force in the direction in which the vehicle body collapses. This direction is opposite to the direction during traveling. Specifically, the direction of force acting on the center of gravity CG generated by steering is reversed corresponding to a change in vehicle speed. As such, a vehicle speed range in which the direction of force acting on the center of gravity CG is reversed exists under the "ordinary state." This makes it difficult to control collapse of the vehicle body by steering, so that achieving control to allow the vehicle 1 to stand on its own by steering can be a difficult task.

As depicted in FIG. 4B, when the front wheel 2 is steered under the "trail length changed state" (steered to the right in FIG. 4B), the center of gravity CG of the vehicle 1 moves in a direction opposite (leftward) to the steered direction. Specifically, under the "trail length changed state," steering the front wheel 2 moves the center of gravity CG in the direction opposite to the steered direction. As a result, steering in the direction in which the vehicle body collapses generates force F in a direction in which the vehicle body stands upright. Specifically, under the "trail length changed state," the force acting on the center of gravity CG of the vehicle 1 by steering is generated in an identical direction at all times whether the vehicle 1 is stationary or traveling, so that continuity of control over the collapse of the vehicle body by steering can be maintained. Thus, controlling to allow the vehicle 1 to stand upright by steering is more easily achieved in the "trail length changed state" than in the "ordinary state."

It is here noted that, in addition to the force F, one possible consideration for the control to allow the vehicle 1 to stand upright is force by a movement of the ground contact point in a roll direction of the front wheel 2 as a result of steering of the front wheel 2.

The vehicle 1 includes a variable trail length mechanism 30 that varies the trail length t of the front wheel 2. The variable trail length mechanism 30 is disposed anterior to the head pipe 17. A configuration of the variable trail length mechanism 30 and a surrounding portion of the variable trail length mechanism 30 will be described below.

Figure 6:
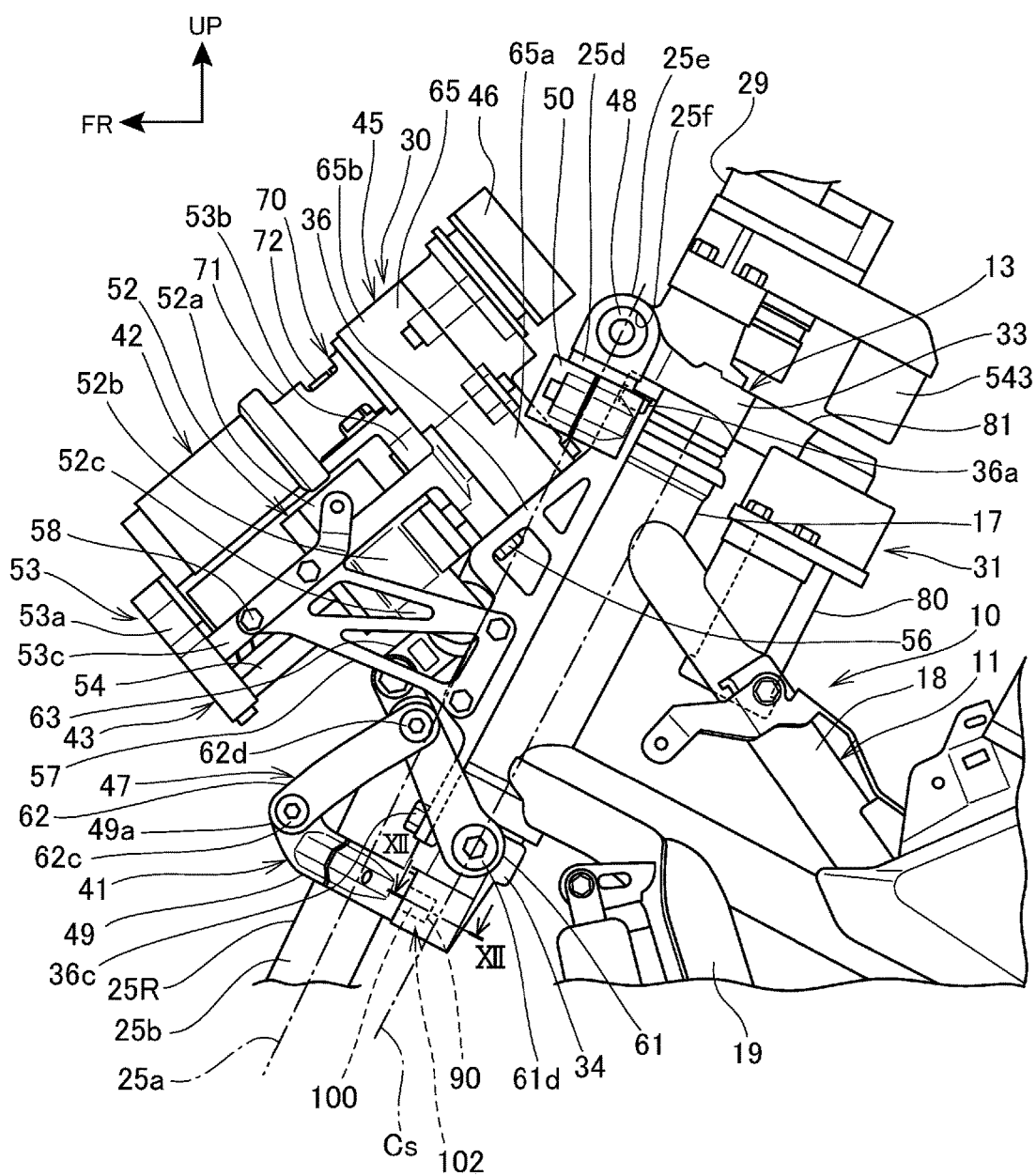
FIG. 6 is a left side elevational view depicting the front portion of the vehicle in an "ordinary state."
Figure 7:
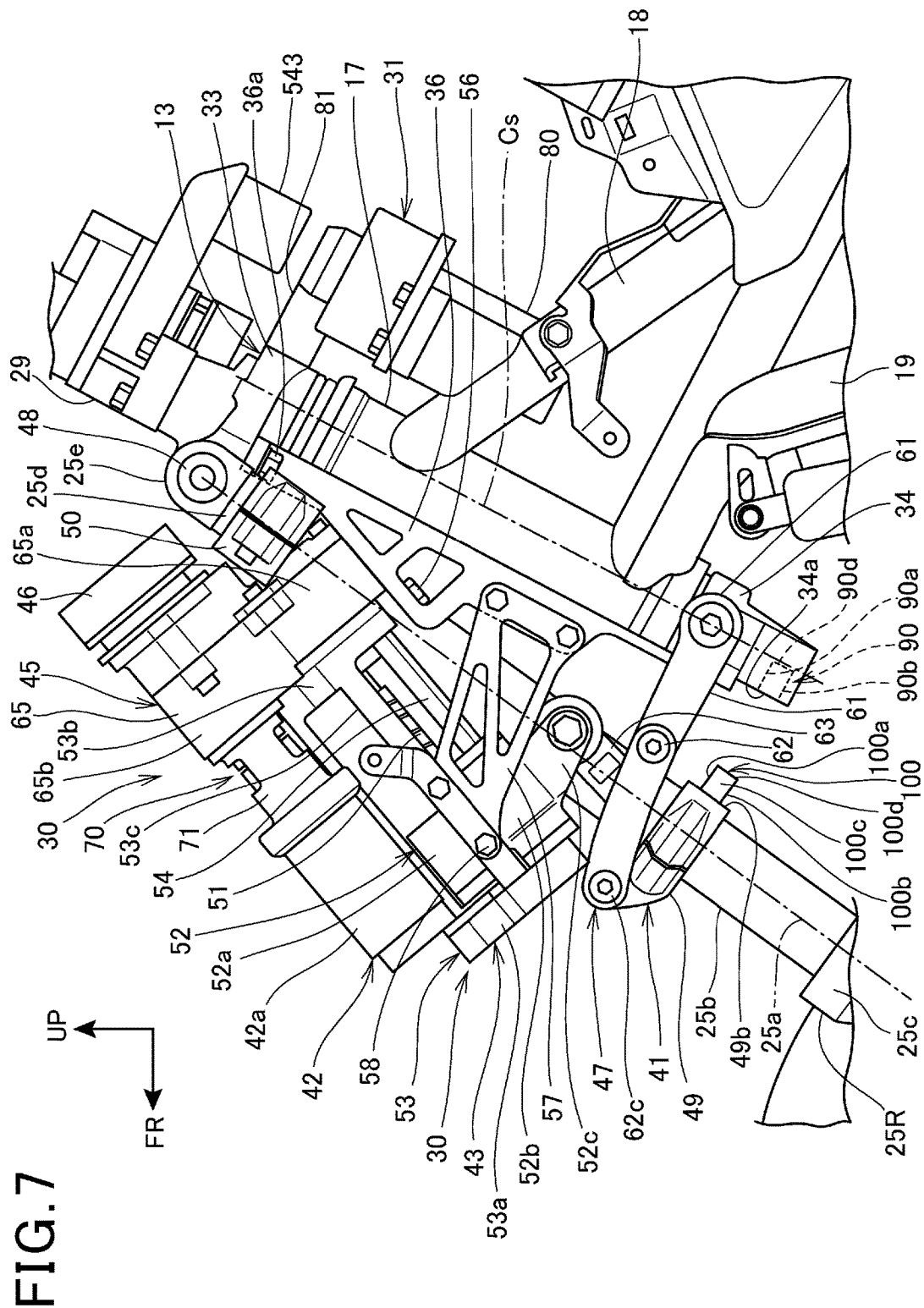
FIG. 7 is a left side elevational view depicting the front portion of the vehicle in a "trail length changed state."
Figure 8:
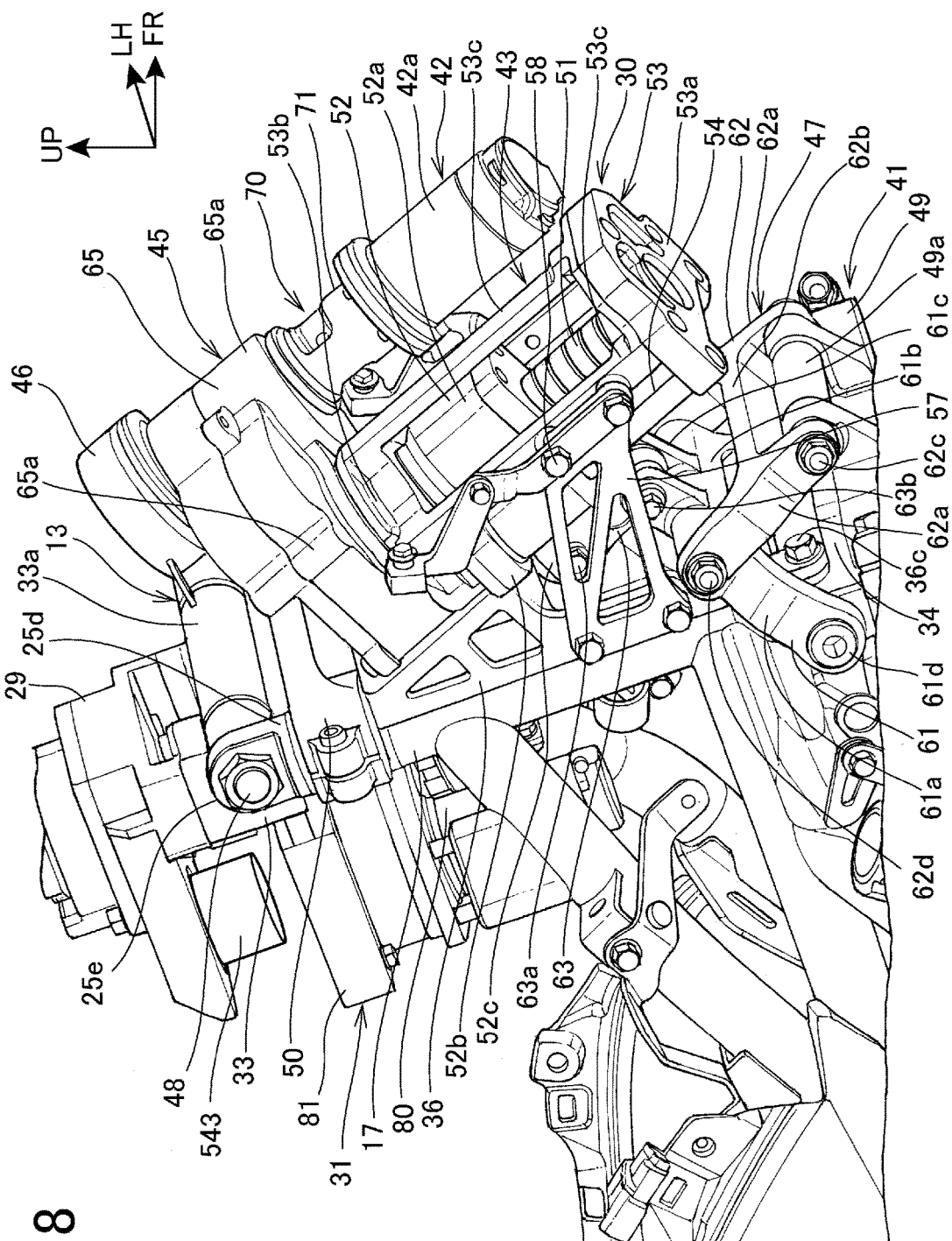
FIG. 8 is a perspective view depicting the front portion of the vehicle as viewed from the front right direction.
Figure 9:
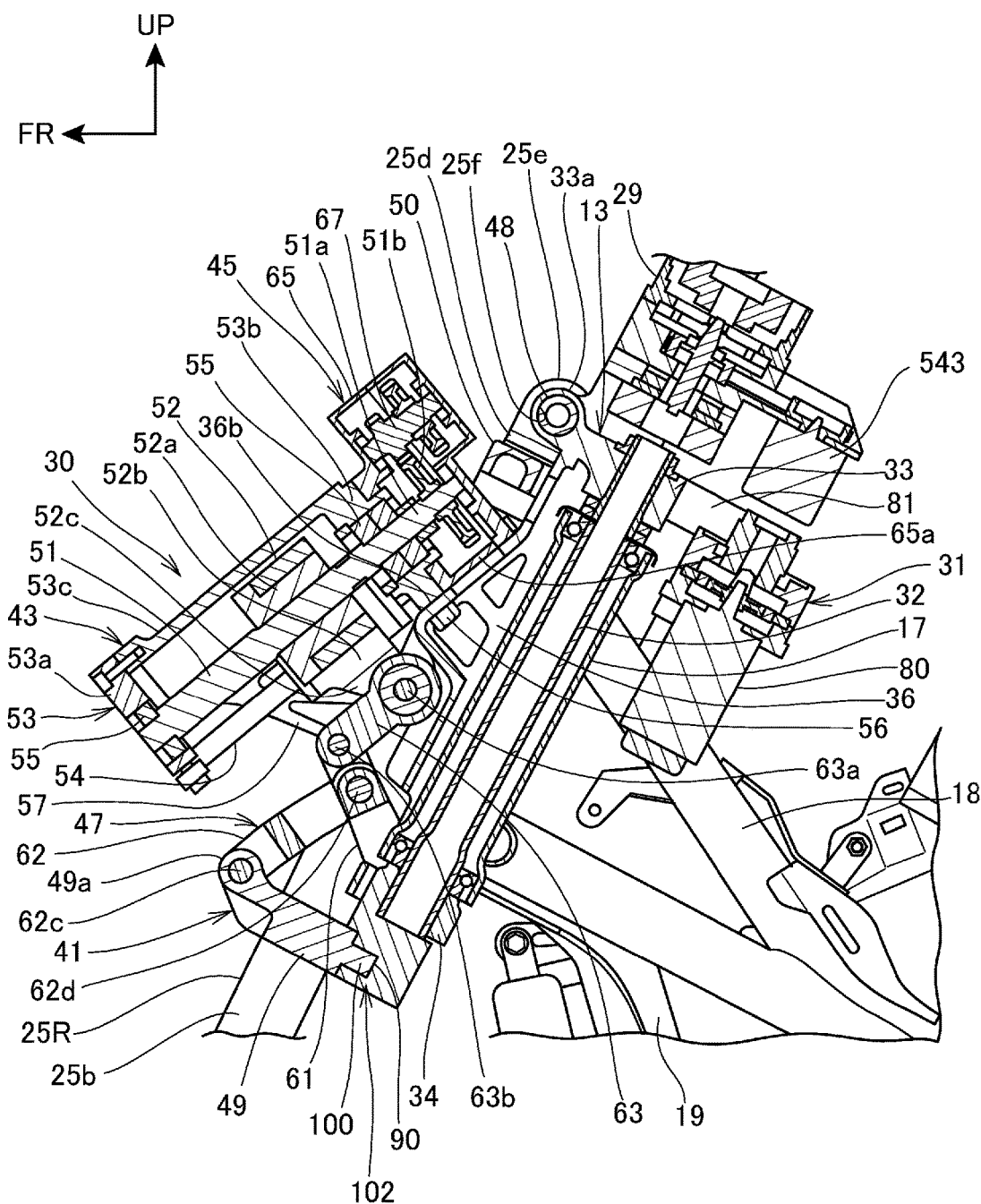
FIG. 9 is a cross-sectional view taken along line IX-IX in FIG. 5.

FIG. 5 is a front elevational view depicting a front portion of the vehicle 1 as viewed from the front. FIG. 6 is a left side elevational view depicting the front portion of the vehicle 1 in the "ordinary state." FIG. 7 is a left side elevational view depicting the front portion of the vehicle 1 in the "trail length changed state." FIG. 8 is a perspective view depicting the front portion of the vehicle 1 as viewed from the front right direction. FIG. 9 is a cross-sectional view taken along line IX-IX in FIG. 5. It is noted that FIGS. 5 to 9 each depict a condition in which the vehicle body cover 15 has been removed. In FIGS. 6 and 7, the front fork 25L on the left-hand side is not depicted. In FIG. 8, the front forks 25L and 25R are not depicted.

Reference is made to FIGS. 5 to 9. The steering rotation unit 13 includes a steering shaft 32 (FIG. 9), a top bridge 33, and a bottom member 34. The steering shaft 32 is passed through and journaled by the head pipe 17. The top bridge 33 is fixed to an upper end portion of the steering shaft 32 that protrudes upwardly from the head pipe 17. The bottom member 34 is fixed to a lower end portion of the steering shaft 32 that protrudes downwardly from the head pipe 17.

The top bridge 33 is a plate-shaped member extending in the vehicle width direction at a portion above the head pipe 17. The bar-shaped steering handlebar 26 is disposed above the top bridge 33. The steering shaft 32 has an axis that is aligned with the steering axis Cs. The steering shaft 32, the top bridge 33, and the bottom member 34 constituting the steering rotation unit 13 integrally rotate about the steering axis Cs.

A bracket 36 is mounted on the steering rotation unit 13. The bracket 36 is disposed between the left and right front forks 25L and 25R and so as to extend vertically along the head pipe 17 at a position anterior to the head pipe 17. The bracket 36 connects the top bridge 33 with the bottom member 34. Specifically, the bracket 36 has an upper end portion fixed to a lower surface of the top bridge 33 by a bolt 36a (FIG. 7). Additionally, the bracket 36 has a lower end portion fixed to a front surface of the bottom member 34 by a bolt 36c (FIGS. 6 and 8). The bracket 36 rotates integrally with the steering rotation unit 13.

The variable trail length mechanism 30 includes an oscillation unit 41, an electric motor 42 (drive source), and a ball screw mechanism 43 (screw mechanism). The oscillation unit 41 is connected with the steering rotation unit 13 so as to be oscillatable in the fore-aft direction. The electric motor 42 supplies a driving force to drive the oscillation unit 41. The ball screw mechanism 43 translates rotation of the electric motor 42 to linear motion to thereby oscillate the oscillation unit 41.

The variable trail length mechanism 30 further includes a speed reducer 45, a lock mechanism 46, and a linkage mechanism 47. The speed reducer 45 transmits rotation of the electric motor 42 with reduced speed to the ball screw mechanism 43. The lock mechanism 46 restricts rotation of the electric motor 42. The linkage mechanism 47 connects the ball screw mechanism 43 with the oscillation unit 41 and the steering rotation unit 13.

The oscillation unit 41 of the variable trail length mechanism 30 includes an oscillation shaft 48 and a bottom bridge 49 (bridge member). The oscillation shaft 48 extends in the vehicle width direction and connects the front forks 25L and 25R oscillatably with the steering rotation unit 13. The bottom bridge 49, while connecting the left and right front forks 25L and 25R, is connected with the linkage mechanism 47.

Additionally, the front forks 25L and 25R are connected with each other in the vehicle width direction by a connecting member 50 disposed superior to the bottom bridge 49.

Under the "ordinary state" depicted in FIG. 6, the front forks 25L and 25R are disposed anterior to the head pipe 17 in a posture in which a fork axis 25a (axis) extending axially in each of the front forks 25L and 25R extends substantially in parallel with the steering axis Cs.

The front forks 25L and 25R each include a fixed tube 25b, a movable tube 25c (FIG. 1), and a fork cap 25d. The fixed tube 25b is supported by the bottom bridge 49. The movable tube 25c is disposed to be capable of an axial stroke movement with respect to the fixed tube 25b.

The front forks 25L and 25R are each an electronic control suspension capable of automatically changing the length in the direction of the fork axis 25a. The length of the front forks 25L and 25R is changed by, for example, an actuator 25g (FIG. 11) disposed in each of the front forks 25L and 25R. The actuator 25g changes preload of a suspension spring disposed in each of the front forks 25L and 25R.

The fixed tube 25b and the movable tube 25c house therein the suspension spring and oil, for example. The fork cap 25d closes an upper opening of the fixed tube 25b. Specifically, the fork cap 25d has a threaded portion formed in an outer peripheral portion thereof and the threaded portion threadedly engages with an internal threaded portion formed in an inner peripheral portion at an upper end portion of the fixed tube 25b. This fixes the fork cap 25d to the upper end portion of the fixed tube 25b.

The connecting member 50 connects the upper end portions of the left and right fixed tubes 25b. The bottom bridge 49 connects lower portions of the left and right fixed tubes 25b.

Each fork cap 25d includes an extended portion 25e that extends upwardly above the upper end of the fixed tube 25b. The extended portion 25e has an oscillation shaft connecting hole 25f formed therein. The oscillation shaft connecting hole 25f passes through the extended portion 25e in the vehicle width direction.

The top bridge 33 of the steering rotation unit 13 includes a tubular oscillation shaft support portion 33a that extends in the vehicle width direction. The oscillation shaft support portion 33a is disposed at a front end portion extending anteriorly the head pipe 17, of the top bridge 33. The oscillation shaft 48 is passed through the oscillation shaft support portion 33a to thereby be connected with the top bridge 33.

The front forks 25L and 25R are journaled on the oscillation shaft 48 under a condition in which the oscillation shaft 48 protruding in the vehicle width direction from the oscillation shaft support portion 33a has both end portions passing through the oscillation shaft connecting holes 25f formed in the fork caps 25d.

Specifically, the oscillation shaft 48 is disposed, in a side elevational view of the vehicle 1, on the axis 25a and aligned with the axis 25a.

Specifically, the front forks 25L and 25R are connected with the top bridge 33 via the oscillation shaft 48 disposed at the upper end portions thereof and are oscillatable in the fore-aft direction about the oscillation shaft 48 disposed on the axis 25a.

The bottom bridge 49 of the oscillation unit 41 includes a tubular oscillation unit-side link connection portion 49a. The oscillation unit-side link connection portion 49a extends in the vehicle width direction and is disposed at a front end portion at a central portion in the vehicle width direction of the bottom bridge 49. The linkage mechanism 47 has a front end portion connected with the oscillation unit-side link connection portion 49a.

When the linkage mechanism 47 operates in the "ordinary state" of FIG. 6, the bottom bridge 49 moves forward as depicted in FIG. 7 and the front forks 25L and 25R oscillate about the oscillation shaft 48. The linkage mechanism 47 will be described in detail later.

In accordance with the first embodiment, the front forks 25L and 25R are rotatable with the front wheel 2 about the steering axis Cs and are oscillatable in the fore-aft direction with the front wheel 2 about the oscillation shaft 48.

The ball screw mechanism 43 includes a threaded shaft 51, a nut member 52, a housing 53, and a guide member 54. The nut member 52 is disposed on the threaded shaft 51. The housing 53 supports the threaded shaft 51. The guide member 54 is disposed to extend in parallel with the threaded shaft 51.

The housing 53 includes a lower wall portion 53a, an upper wall portion 53b, and a plurality of columnar connecting portions 53c. The lower wall portion 53a supports a first end portion (lower end portion) of the threaded shaft 51. The upper wall portion 53b supports a second end (upper end) side of the housing 53. The connecting portions 53c vertically connect a circumferential edge portion of the lower wall portion 53a with a circumferential edge portion of the upper wall portion 53b.

The lower wall portion 53a and the upper wall portion 53b are each formed into a plate shape that is orthogonal to the threaded shaft 51. The threaded shaft 51 is rotatably supported via bearings 55, 55 disposed at central portions of the lower wall portion 53a and the upper wall portion 53b. The connecting portions 53c extend substantially in parallel with the threaded shaft 51.

The guide member 54 is formed into a shaft shape connecting the lower wall portion 53a with the upper wall portion 53b. The guide member 54 is disposed posterior to the threaded shaft 51.

The nut member 52 integrally includes a nut portion 52a and a moving portion 52b. The nut portion 52a is disposed on the threaded shaft 51. The moving portion 52b is disposed on the guide member 54. The moving portion 52b includes a screw mechanism-side link connection portion 52c that extends to the outside of the housing 53 toward the head pipe 17 side in the rear.

The threaded shaft 51 has a second end portion 51a (FIG. 9) passing through the upper wall portion 53b to extend upwardly. An input gear 51b is disposed at the second end portion 51a.

The ball screw mechanism 43 is disposed in a position such that the threaded shaft 51 leans backward relative to the vertical direction in a side elevational view. The threaded shaft 51 leans greatly backward with respect to the steering axis Cs.

The bracket 36 has a mounting surface 36b on a front surface thereof. The mounting surface 36b leans backward with respect to the steering axis Cs. The ball screw mechanism 43 is disposed such that a rear surface portion of an upper portion of the housing 53 abuts on the mounting surface 36b. The ball screw mechanism 43 is fixed to the mounting surface 36b by a bolt 56 that is passed from the rear through the mounting surface 36b.

Support pieces 57, 57 extending anteriorly are attached to left and right lateral surfaces at a lower portion of the bracket 36.

The ball screw mechanism 43 is fixed to the support pieces 57, 57 by bolts 58 that are passed through front end portions of the support pieces 57, 57 from outsides in the vehicle width direction and fastened to the connecting portions 53c.

The ball screw mechanism 43 is fixed to the steering rotation unit 13 via the bracket 36 and rotates integrally with the steering rotation unit 13 in the steered direction of the front wheel 2.

The ball screw mechanism 43 is disposed anterior to the steering rotation unit 13 and, in the front elevational view in FIG. 5, disposed between the left and right front forks 25L and 25R. The threaded shaft 51 is disposed at the center in the vehicle width direction in the vehicle 1 and extends in the vertical direction, as with the steering axis Cs. Additionally, the ball screw mechanism 43 is disposed in the vertical direction between the oscillation shaft 48 and the bottom bridge 49.

The linkage mechanism 47 includes a first link 61, a second link 62, and a third link 63. The first link 61 extends anteriorly from the bottom member 34. The second link 62 extends posteriorly from the bottom bridge 49 and is connected with a front portion of the first link 61. The third link 63 connects the first link 61 with the moving portion 52b of the ball screw mechanism 43.

More specifically, as depicted in FIG. 8, the first link 61 includes a pair of left and right arm portions 61a, 61a, a tubular portion 61b, and a connecting portion 61c. The arm portions 61a, 61a extend anteriorly from left and right lateral surfaces of the bottom member 34. The tubular portion 61b connects leading end portions of the arm portions 61a, 61a in the vehicle width direction. The connecting portion 61c protrudes anteriorly from a central portion of the tubular portion 61b.

The first link 61 is rotatably mounted on the bottom member 34 via a connecting shaft 61d that extends in the vehicle width direction.

As depicted in FIG. 8, the second link 62 includes a pair of left and right arm portions 62a, 62a and a cross member 62b. The arm portions 62a, 62a extend posteriorly from left and right end portions of the oscillation unit-side link connection portion 49a of the bottom bridge 49 along a portion above the bottom bridge 49. The cross member 62b connects the arm portions 62a, 62a in the vehicle width direction.

The second link 62 is rotatably mounted on the oscillation unit-side link connection portion 49a via a connecting shaft 62c that extends in the vehicle width direction.

The arm portions 62a, 62a of the second link 62 have leading end portions overlapping the tubular portion 61b of the first link 61 from the outsides in the vehicle width direction. The arm portions 62a, 62a are rotatably mounted with respect to the first link 61 via a connecting shaft 62d that is passed through the leading end portions and the tubular portion 61b.

The third link 63 has an upper end portion rotatably mounted with respect to the screw mechanism-side link connection portion 52c via a connecting shaft 63a that extends in the vehicle width direction. The third link 63 further has a lower end portion rotatably mounted with respect to the connecting portion 61c of the first link 61 via a connecting shaft 63b that extends in the vehicle width direction.

Figure 10:
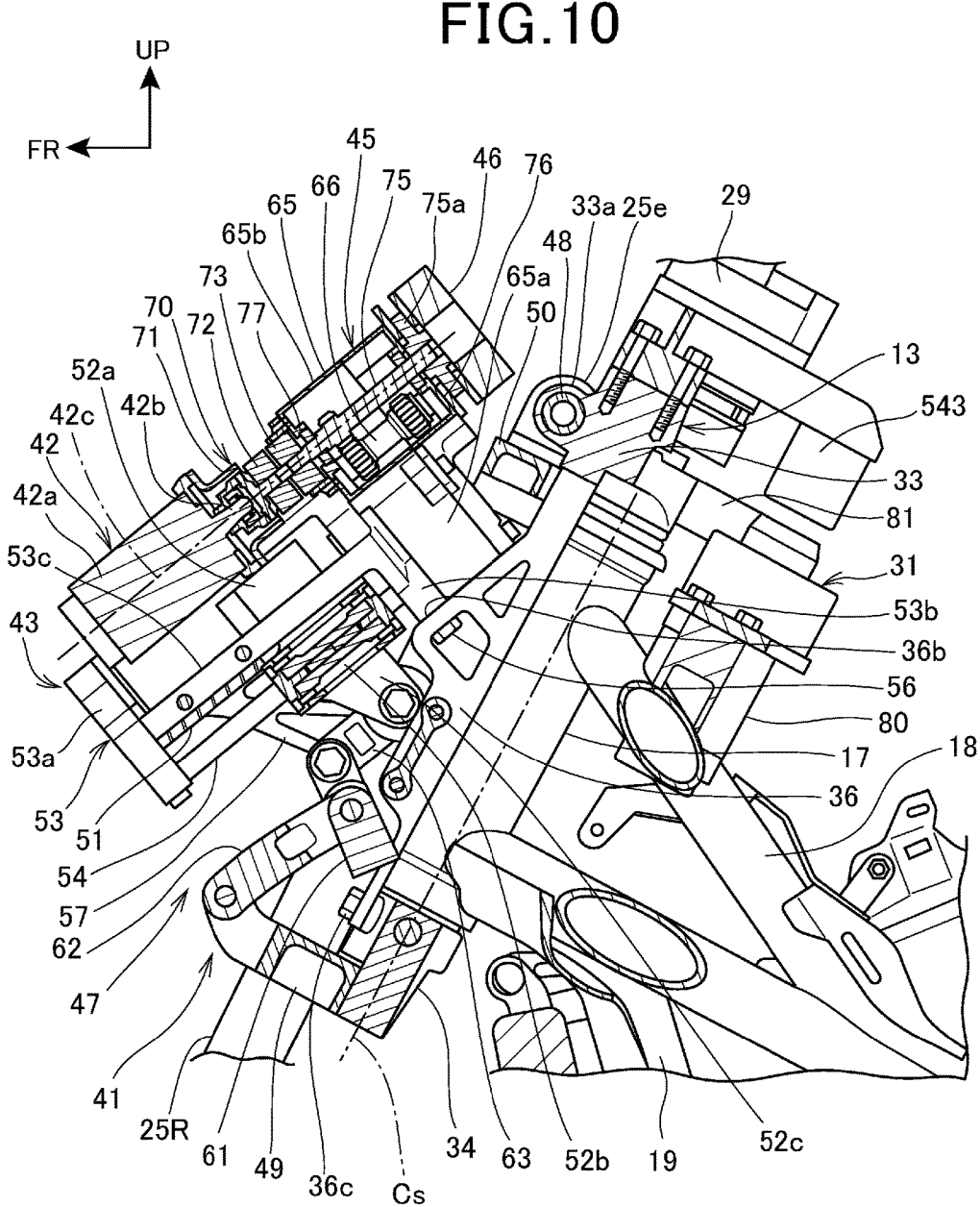
FIG. 10 is a cross-sectional view taken along line X-X in FIG. 5.

FIG. 10 is a cross-sectional view taken along line X-X in FIG. 5.

Reference is made to FIGS. 5 to 10. The speed reducer 45 includes a box-shaped speed reducer case 65, first transmission shaft 66, and a second transmission shaft 67. The first transmission shaft 66 and the second transmission shaft 67 are supported by, and housed in, the speed reducer case 65.

The speed reducer 45 is mounted on an upper surface of the ball screw mechanism 43. More specifically, the speed reducer case 65 has a lower surface portion fixed to the upper wall portion 53b of the ball screw mechanism 43. Specifically, the speed reducer 45 is supported by the bracket 36 via the ball screw mechanism 43.

In a side elevational view as in, for example, FIG. 6, the speed reducer case 65 extends upwardly toward the front along the upper wall portion 53b.

The speed reducer case 65 includes a screw mechanism-side case portion 65a and a motor-side case portion 65b integrated with each other. The screw mechanism-side case portion 65a is fixed to the upper surface of the ball screw mechanism 43. The motor-side case portion 65b extends anteriorly and outwardly in the vehicle width direction from the screw mechanism-side case portion 65a.

The first transmission shaft 66 is in mesh with the second transmission shaft 67. The first transmission shaft 66 and the second transmission shaft 67 are disposed in parallel with the threaded shaft 51 of the ball screw mechanism 43 and thus lean backward. The second transmission shaft 67 meshes with the input gear 51b disposed at the second end portion 51a of the threaded shaft 51 of the ball screw mechanism 43. The second end portion 51a and the input gear 51b are housed in the screw mechanism-side case portion 65a.

The electric motor 42 is mounted on the speed reducer 45 via a coupling unit 70 as a joint.

The coupling unit 70 includes a tubular case 71, a drive-side coupling member 72, and a driven-side coupling member 73. The drive-side coupling member 72 and the driven-side coupling member 73 are housed in the case 71.

The case 71 has an upper end fixed to a lower surface of the motor-side case portion 65b and extends substantially in parallel with the threaded shaft 51.

The electric motor 42 includes a motor main unit 42a and a rotary shaft 42b. The motor main unit 42a houses, for example, a rotor. The rotary shaft 42b assumes an output shaft of the electric motor 42. The electric motor 42 is formed into a columnar shape that is long in a direction of an axis 42c of the rotary shaft 42b.

The electric motor 42 is disposed such that the rotary shaft 42b can be inserted from below into the case 71 and the motor main unit 42a is fixed to a lower end of the case 71. Specifically, the electric motor 42 is mounted on the steering rotation unit 13 of the vehicle body 10 via the coupling unit 70, the speed reducer case 65, the ball screw mechanism 43, and the bracket 36.

Under a condition in which the electric motor 42 is fixed to the case 71, the axis 42c of the rotary shaft 42b extends in parallel with the threaded shaft 51 of the ball screw mechanism 43. Additionally, the axis 42c is oriented in the vertical direction of the vehicle 1 in a posture in which the axis 42c leans backward more than the steering axis Cs does with respect to the vertical direction in a side elevational view of FIG. 6 and the like.

The electric motor 42, because being disposed so as to be suspended downwardly from the motor-side case portion 65b, is disposed at a position anterior to the ball screw mechanism 43 and offset laterally from the ball screw mechanism 43. Additionally, the electric motor 42 is disposed between the left and right front forks 25L and 25R in the front elevational view in FIG. 5.

The drive-side coupling member 72 and the driven-side coupling member 73 connect the rotary shaft 42b of the electric motor 42 with an input shaft 75 (FIG. 10) housed in the motor-side case portion 65b of the speed reducer 45.

The input shaft 75 is disposed coaxially with the axis 42c of the rotary shaft 42b of the electric motor 42 and extends in parallel with the rotary shaft 42b and the threaded shaft 51.

The input shaft 75 meshes with the first transmission shaft 66 of the speed reducer 45. The input shaft 75 has an upper end portion supported by an upper surface portion 76 of the motor-side case portion 65b via a bearing and has a lower end portion supported by a lower surface portion 77 of the motor-side case portion 65b via a bearing.

The lower end of the input shaft 75 protrudes inferiorly the motor-side case portion 65b and is connected with the driven-side coupling member 73.

The rotary shaft 42b of the electric motor 42 has an upper end portion connected with the drive-side coupling member 72. The drive-side coupling member 72 is connected with the driven-side coupling member 73.

The lock mechanism 46 is an electromagnetic clutch disposed coaxially with the axis 42c of the rotary shaft 42b.

The input shaft 75 includes at its upper end a lock portion 75a (FIG. 10) disposed superior to the upper surface portion 76 of the motor-side case portion 65b. The lock mechanism 46 is mounted from above on the upper surface portion 76 of the motor-side case portion 65b.

When an electromagnet is not energized, an actuating portion of the lock mechanism 46 is urged by an urging member and engages with the lock portion 75a of the input shaft 75 and rotation of the input shaft 75 is restricted. When the electromagnet is energized, the actuating portion of the lock mechanism 46 resists the urging member with a magnetic force of the electromagnet to be disengaged from the lock portion 75a of the input shaft 75.

Specifically, when the lock mechanism 46 is not energized, the input shaft 75 is unable to rotate and thus the electric motor 42 is unable to rotate. When the lock mechanism 46 is energized, the input shaft 75 is able to rotate and thus the electric motor 42 is able to rotate.

The vehicle 1 further includes an automatic steering mechanism 31 that drives the steering rotation unit 13 to thereby turn the front wheel 2.

The automatic steering mechanism 31 includes a steering motor 80 and a steering link 81. The steering motor 80 assumes a steering drive source. The steering link 81 serves as a driving force transmission member that transmits a driving force of the steering motor 80 to the steering rotation unit 13.

The steering motor 80 is supported on the main frame 18 at a position posterior to the head pipe 17.

The steering link 81 extends from an output shaft 80a of the steering motor 80 toward the front laterally along the head pipe 17 and is connected with the top bridge 33 of the steering rotation unit 13.

Figure 11:
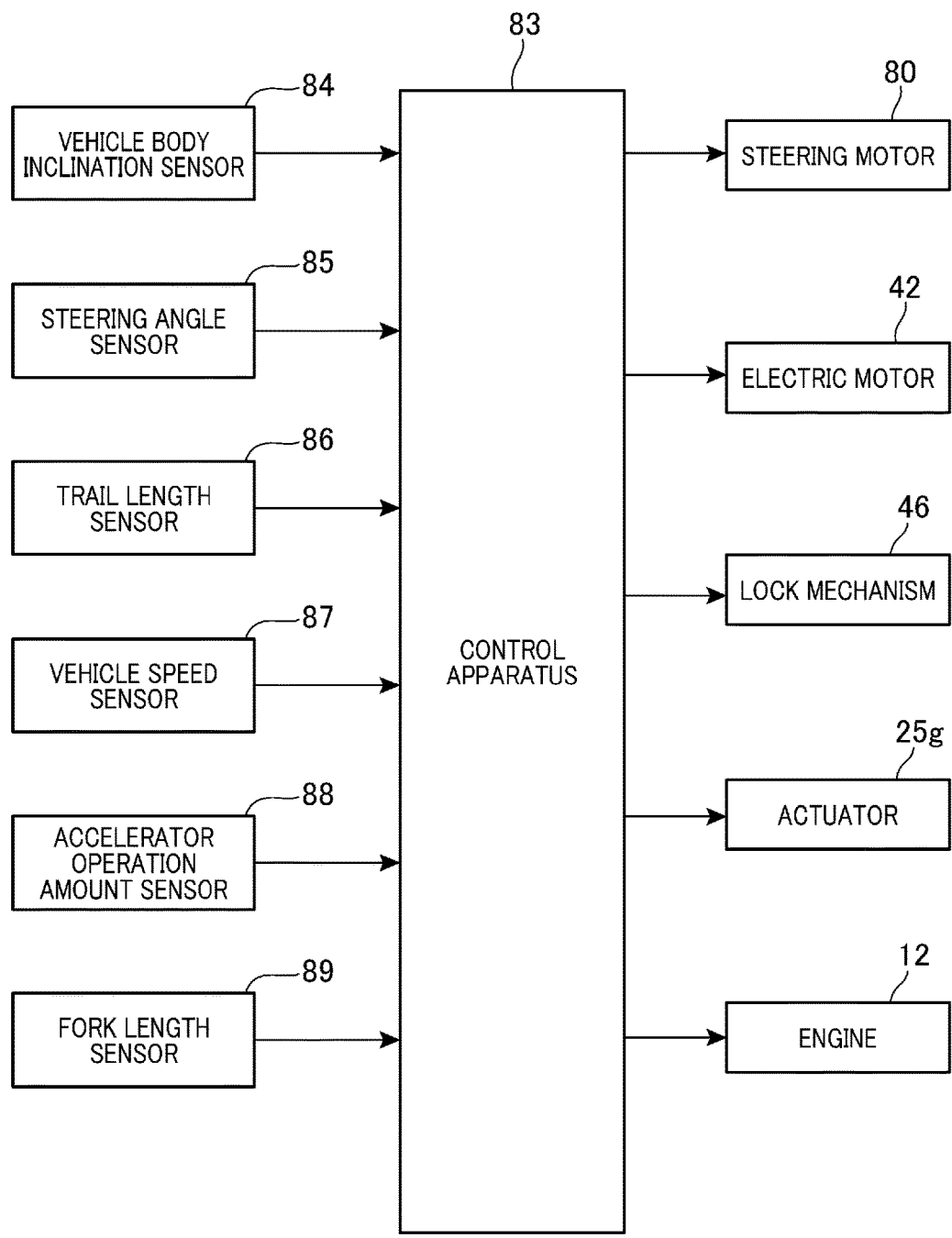
FIG. 11 is a block diagram depicting a configuration relating to control of the vehicle.

FIG. 11 is a block diagram depicting a configuration relating to control of the vehicle 1.

The vehicle 1 includes a control apparatus 83 that performs control processes for operations of the steering motor 80, the electric motor 42 and the lock mechanism 46 of the variable trail length mechanism 30, the actuator 25g of the front forks 25L and 25R, and the engine 12.

In addition, the vehicle 1 includes, as sensors for detecting various types of state quantities required for the control processes performed by the control apparatus 83, a vehicle body inclination sensor 84, a steering angle sensor 85, a trail length sensor 86, a vehicle speed sensor 87, an accelerator operation amount sensor 88, and a fork length sensor 89. The vehicle body inclination sensor 84 detects an inclination angle of the vehicle body 10 in the roll direction. The steering angle sensor 85 detects a steering angle of the front wheel 2 about the steering axis Cs. The trail length sensor 86 detects the trail length t. The vehicle speed sensor 87 detects a traveling speed of the vehicle 1. The accelerator operation amount sensor 88 detects an operation amount of an accelerator grip on the steering handlebar 26. The fork length sensor 89 detects an axial length of each of the front forks 25L and 25R.

The control apparatus 83 is an electronic circuit unit including a central processing unit (CPU), a random-access memory (RAM), a read-only memory (ROM), and an interface circuit. The control apparatus 83 is mounted on the vehicle 1. Each of the foregoing sensors 84 to 89 is connected with the control apparatus 83 and an output (detection signal) of each of the foregoing sensors 84 to 89 is applied to the control apparatus 83.

The control apparatus 83 drives the engine 12 on the basis of the output from the accelerator operation amount sensor 88, thereby causing the vehicle 1 to travel.

When the electric motor 42 is driven by the control apparatus 83, the variable trail length mechanism 30 operates to vary the trail length t.

More specifically, rotation of the electric motor 42 is transmitted to the threaded shaft 51 of the ball screw mechanism 43 via, in sequence from the electric motor 42 side, the rotary shaft 42b, the drive-side coupling member 72 and the driven-side coupling member 73, the input shaft 75, the first transmission shaft 66 and the second transmission shaft 67 of the speed reducer 45, and the input gear 51b.

The rotation of the electric motor 42 is transmitted to the threaded shaft 51 with speed greatly reduced by the speed reducer 45.

When the threaded shaft 51 is rotated by the electric motor 42, the nut member 52 moves linearly on the threaded shaft 51 along the guide member 54.

The movement of the nut member 52 on the threaded shaft 51 deforms the linkage mechanism 47 and, as the linkage mechanism 47 deforms, the bottom bridge 49 that is connected with the second link 62 moves to the front and rear.

The movement of the bottom bridge 49 in the fore-aft direction causes the front forks 25L and 25R to oscillate to the front and rear about the oscillation shaft 48, thus changing the trail length t.

In the "ordinary state" depicted in FIG. 6, the nut member 52 is moved by the drive of the electric motor 42 upwardly until the nut member 52 abuts on the upper wall portion 53b. This raises the connecting shaft 62d of the second link 62 and moves the connecting shaft 62c at the front end of the second link 62 to the rear, so that the front forks 25L and 25R oscillate toward the rear via the bottom bridge 49. In the "ordinary state," the trail length t is changed such that the front wheel 2 is disposed at a rearmost position.

In addition, in the "ordinary state," the rear surface of the bottom bridge 49 abuts on the front surface of the bottom member 34. This restricts a rearward oscillation position of the front forks 25L and 25R.

Additionally, in the "ordinary state," the control apparatus 83 does not energize the lock mechanism 46 and rotation of the electric motor 42 is locked and restricted by the lock mechanism 46. The lock mechanism 46 further restricts movement of the nut member 52, so that the lock mechanism 46 restricts oscillation of the front forks 25L and 25R. This prevents the front forks 25L and 25R from changing into the "trail length changed state" from the "ordinary state" as caused by, for example, an external force from a road surface.

When rotation is transmitted from the ball screw mechanism 43 side to the electric motor 42 side via the speed reducer 45, the rotation builds up speed and torque on the ball screw mechanism 43 side is reduced by the speed reducer 45 and transmitted to the input shaft 75.

In the first embodiment, the lock mechanism 46 is disposed on the input shaft 75, upstream of the first transmission shaft 66 of the speed reducer 45 in the transmission path of the rotation of the electric motor 42. This arrangement makes small the torque transmitted from the ball screw mechanism 43 to the input shaft 75 even when the nut member 52 moves downwardly from the "ordinary state." Thus, even with the lock mechanism 46 having a smaller locking capacity, the lock mechanism 46 can still restricts oscillation of the front forks 25L and 25R.

In the "trail length changed state" depicted in FIG. 7, the nut member 52 is moved by the drive of the electric motor 42 downwardly until the nut member 52 abuts on the lower wall portion 53a. This lowers the connecting shaft 62d of the second link 62 and moves the connecting shaft 62c at the front end of the second link 62 to the front, so that the front forks 25L and 25R oscillate toward the front via the bottom bridge 49.

Additionally, in the "trail length changed state," the control apparatus 83 does not energize the lock mechanism 46 and rotation of the electric motor 42 is locked and restricted by the lock mechanism 46. The lock mechanism 46 further restricts movement of the nut member 52, so that the lock mechanism 46 restricts oscillation of the front forks 25L and 25R. This prevents the front forks 25L and 25R from changing into the "ordinary state" from the "trail length changed state" as caused by, for example, an external force from the road surface.

In the first embodiment, the electric motor 42 is supported by the steering rotation unit 13 of the vehicle body 10 via the speed reducer 45, the ball screw mechanism 43, and the bracket 36. The electric motor 42 can thus be disposed close to the steering axis Cs. The arrangement allows steering inertia of the steering rotation unit 13 to be reduced, so that the front wheel 2 can be easily steered.

The front forks 25L and 25R oscillate about the oscillation shaft 48 that is disposed at a position overlapping the fork axis 25a in a side elevational view, so that inertia weight developing when the front forks 25L and 25R oscillate can be reduced. Thus, the front forks 25L and 25R can be oscillated by a small driving force. Additionally, the front forks 25L and 25R can be oscillated quickly and a change in the trail length t can be made swiftly.

Exemplary operations of the variable trail length mechanism 30, the automatic steering mechanism 31, and the front forks 25L and 25R will be described below.

When the vehicle speed detected by the vehicle speed sensor 87 exceeds a predetermined speed (e.g., 4 km/h), the control apparatus 83 maintains the vehicle 1 in the "ordinary state." During traveling in the "ordinary state," the control apparatus 83 does not energize the lock mechanism 46 and oscillation of the front forks 25L and 25R is locked. In the "ordinary state," the control apparatus 83 reduces a control amount of the steering motor 80 of the automatic steering mechanism 31. Thus, in the "ordinary state," the operator steers the front wheel 2 via the steering handlebar 26.

When the vehicle speed detected by the vehicle speed sensor 87 is equal to or lower than, a predetermined speed (e.g., 3 km/h) including a stationary state (0 km/h), the control apparatus 83 changes the state of the vehicle 1 to the "trail length changed state."

First, the control apparatus 83 energizes, in the "ordinary state," the lock mechanism 46 to thereby cancel the oscillation locked state of the front forks 25L and 25R. The control apparatus 83 next drives the electric motor 42 to thereby cause the front forks 25L and 25R to oscillate to the front about the oscillation shaft 48 to set the "trail length changed state" and de-energizes the lock mechanism 46 to thereby restrict oscillation of the front forks 25L and 25R.

When in the "trail length changed state," the control apparatus 83 increases the control amount of the steering motor 80 to steer the front wheel 2. More specifically, the control apparatus 83 drives the steering motor 80 on the basis of outputs from the vehicle body inclination sensor 84 and the steering angle sensor 85 so that the vehicle 1 stands in an upright position, specifically, inclination based on the vehicle body inclination sensor 84 is zero. As described previously, in the "trail length changed state," steering the front wheel 2 moves the center of gravity CG in a direction opposite to the steered direction, thus generating the force F (FIG. 4B) that acts in a direction in which the vehicle 1 stands upright on its own. Thus, driving the steering motor 80 in a direction in which the vehicle body is steered to collapse allows the vehicle 1 to stand upright on its own.

In the "trail length changed state," the control by the control apparatus 83 allows the vehicle 1 to stand upright on its own, so that even when the vehicle 1 is stationary, the vehicle 1 can stand upright on its own without any support by a stand or the operator.

In the "trail length changed state" and the "ordinary state," the control apparatus 83 drives the actuator 25g of the front forks 25L and 25R on the basis of the output from the fork length sensor 89 and adjusts the axial length of the front forks 25L and 25R so as to minimize variations in a vehicle height.

More specifically, when the state is changed from the "ordinary state" to the "trail length changed state," the front forks 25L and 25R lean further backward, resulting in a lower vehicle height of the vehicle 1. Thus, the control apparatus 83 drives the actuator 25g to thereby extend the overall length of the front forks 25L and 25R so that a vehicle height identical to a vehicle height in the "ordinary state" can be obtained even in the "trail length changed state." This arrangement minimizes changes in maneuverability of the vehicle 1 caused by changes in the trail length t.

The vehicle 1 further includes a steering handlebar rotation mechanism that makes the steering handlebar 26 capable of relative rotation about the steering axis Cs with respect to the steering rotation unit 13. The steering handlebar rotation mechanism is disposed on the upper surface of the top bridge 33. The steering handlebar rotation mechanism includes a handlebar rotation motor 543 (see, for example, FIG. 10) that rotates the steering handlebar 26 about the steering axis Cs. The handlebar rotation motor 543 is disposed superior to the steering motor 80.

When steering the front wheel 2 using the automatic steering mechanism 31, the control apparatus 83 drives the handlebar rotation motor 543 to thereby rotate the steering handlebar 26 with respect to the steering rotation unit 13. While the vehicle 1 is traveling at low speeds, for example, the control apparatus 83 causes the steering handlebar 26 to rotate through an angle identical to the steering angle of the front wheel 2 in a direction opposite to the steered direction of the front wheel 2 by the automatic steering mechanism 31. This approach allows only the front wheel 2 to be steered under a condition in which the steering handlebar 26 is seemed to remain stationary. Thus, even when the front wheel 2 is steered by the automatic steering mechanism 31, the movement of the steering handlebar 26 can be prevented from being imparted to the operator.

The variable trail length mechanism 30 is arranged to make the front forks 25L and 25R oscillatable and thus includes movable portions. The variable trail length mechanism 30 thus can affect stiffness of a structure surrounding the front wheel 2. The inventors clarified through experiments and calculations, for example, capability of enhancing maneuverability of the vehicle 1 in the configuration including the variable trail length mechanism 30 by increasing stiffness in the vehicle width direction of the front wheel 2 surrounding structure, in particular.

Figure 12:
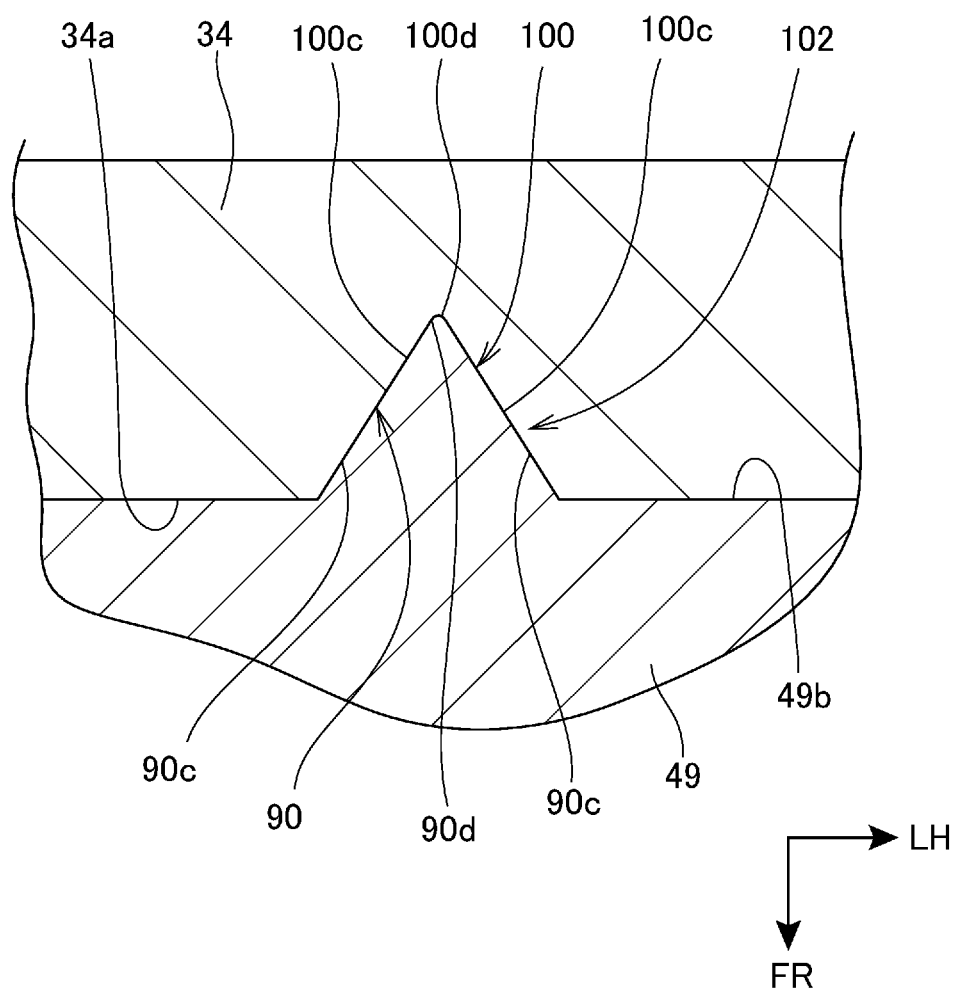
FIG. 12 is a cross-sectional view taken along line XII-XII in FIG. 6.

The following describes, with reference to FIG. 12, for example, a structure that improves stiffness of the front wheel 2 surrounding structure.

FIG. 12 is a cross-sectional view taken along line XII-XII in FIG. 6.

Reference is made to FIGS. 6, 7, 9, 10, and 12. The bottom bridge 49 of the oscillation unit 41 includes a fitting portion 100 that fits in a fitted portion 90 disposed on the bottom member 34 of the steering rotation unit 13. The fitting portion 100 and the fitted portion 90 constitute a torsion reduction portion 102 that reduces torsion of the oscillation unit 41 in the vehicle width direction through the oscillation unit 41 combined with the steering rotation unit 13.

The fitting portion 100 is a protrusion that protrudes to the rear from a rear surface 49b of the bottom bridge 49.

The fitted portion 90 is a recess formed in a front surface 34a of the bottom member 34. The fitted portion 90 is recessed toward the rear so as to allow the fitting portion 100 to be fitted therein. The fitted portion 90 and the fitting portion 100 are disposed at a center in the vehicle width direction as with the steering axis Cs.

The fitting portion 100 is a triangular protrusion having a leading end 100d protruding to the rear. More specifically, as depicted in FIGS. 7 and 12, the fitting portion 100 has a protrusion upper surface 100a and a protrusion lower surface 100b that protrude to the rear from the rear surface 49b and left and right protrusion lateral surfaces 100c, 100c (lateral wall portions) that extend to the rear from the rear surface 49b.

The protrusion upper surface 100a and the protrusion lower surface 100b extend in a direction orthogonal to the fork axis 25a in parallel with each other.

The left and right protrusion lateral surfaces 100c, 100c together form the fitting portion 100 inclined to have the tapering leading end 100d. The protrusion lateral surfaces 100c, 100c assume outer lateral surfaces in the vehicle width direction of the fitting portion 100.

The fitted portion 90 is a triangular recess formed to taper toward a bottom portion 90d thereof. More specifically, as depicted in FIGS. 7 and 12, the fitted portion 90 includes a recess upper surface 90a, a recess lower surface 90b, and left and right recess lateral surfaces 90c, 90c.

The recess upper surface 90a and the recess lower surface 90b are formed to extend in parallel with each other. The left and right recess lateral surfaces 90c, 90c together form the fitted portion 90 inclined to have the tapering toward the bottom portion 90d.

Under the "trail length changed state" depicted in FIG. 7, the bottom bridge 49 is spaced away from the bottom member 34 and the fitting portion 100 does not fit in the fitted portion 90.

Under the "ordinary state" depicted in FIGS. 6, 9, 10 and 12, the rear surface 49b of the bottom bridge 49 abuts on, and is received by, the front surface 34a of the bottom member 34 and the fitting portion 100 fits in the fitted portion 90.

Under the "ordinary state," the protrusion lateral surfaces 100c, 100c of the fitting portion 100 abut on the recess lateral surfaces 90c, 90c of the fitted portion 90 in the vehicle width direction, so that the bottom bridge 49 is rigidly positioned with respect to the bottom member 34 in the vehicle width direction. This enhances stiffness of the front wheel 2 surrounding structure including, for example, the front wheel 2, the front forks 25L and 25R, and the bottom bridge 49, so that maneuverability of the vehicle 1 under the "ordinary state" can be improved.

Additionally, under the "ordinary state," the protrusion upper surface 100a of the fitting portion 100 abuts on the recess upper surface 90a and the protrusion lower surface 100b abuts on the recess lower surface 90b. This rigidly positions the bottom bridge 49 with respect to the bottom member 34 in the vertical direction, so that stiffness of the front wheel 2 surrounding structure can be enhanced and maneuverability of the vehicle 1 under the "ordinary state" can be improved.

The vehicle 1 is set into the "ordinary state" at a speed range higher than a speed range in the "trail length changed state." Thus, in the first embodiment, stiffness can be effectively improved under the "ordinary state" in which higher stiffness is required than in the "trail length changed state."

Additionally, because of the protrusion lateral surfaces 100c, 100c, the fitting portion 100 tapers toward the leading end 100d. The fitting portion 100 can thus be easily fitted into the fitted portion 90 so as to be guided along the protrusion lateral surfaces 100c, 100c.

It is noted that the fitting portion 100 is required to be configured such that at least the protrusion lateral surfaces 100c, 100c abut on the recess lateral surfaces 90c, 90c. For example, under a condition in which the fitting portion 100 is fitted in the fitted portion 90, the protrusion upper surface 100a and the protrusion lower surface 100b may be configured to be spaced away from the recess upper surface 90a and the recess lower surface 90b, respectively, and thus the fitting portion 100 is configured not to be positioned vertically. This alternative configuration enables the fitting portion 100 to be easily fitted in the fitted portion 90 and dimensional accuracy of the fitting portion 100 and the fitted portion 90 to be easily managed.

Additionally, under the condition in which the fitting portion 100 is fitted in the fitted portion 90, the leading end 100d of the fitting portion 100 may be configured to be spaced away from the bottom portion 90d of the fitted portion 90. This configuration also enables easy management of dimension accuracy.

As described above, in accordance with the first embodiment to which the present invention is applied, the vehicle 1 includes the vehicle body 10 and the front wheel 2 that is disposed anterior to the vehicle body 10 and is steerable about the steering axis Cs. The vehicle body 10 includes the vehicle body frame 11 and the steering rotation unit 13 that is supported on the vehicle body frame 11 and that rotates about the steering axis Cs. The vehicle 1 further includes the variable trail length mechanism 30 that varies the trail length t of the front wheel 2. The variable trail length mechanism 30 includes the oscillation unit 41 that supports the front forks 25L and 25R that are disposed to be oscillatable in the fore-aft direction and that support the front wheel 2 and the electric motor 42 as a drive source for oscillating the oscillation unit 41. The electric motor 42 is supported on the vehicle body 10. The electric motor 42, being supported on the vehicle body 10, is close to the steering axis Cs, so that steering inertia can be reduced.

Additionally, the electric motor 42, because being supported by the steering rotation unit 13 of the vehicle body 10, is close to the steering axis Cs. The steering inertia can thus be reduced. Additionally, because the steering rotation unit 13 rotates integrally with the oscillation unit 41, the driving force of the electric motor 42 that is supported by the steering rotation unit 13 can be transmitted, through a simple structure, to the oscillation unit 41 to thereby oscillate the oscillation unit 41.

The electric motor 42 is disposed, in a vehicle side elevational view, anterior to the steering rotation unit 13 and has the axis 42c of the rotary shaft 42b thereof oriented in the vertical direction of the vehicle 1. Thus, the electric motor 42 can be compactly disposed and the steering inertia can be reduced. It is noted that the axis 42c is required only to be oriented vertically in the vehicle 1. For example, the axis 42c may be oriented substantially perpendicularly. Alternatively, the axis 42c may be oriented vertically in an inclined posture in the vehicle side elevational view as depicted in FIG. 10.

The variable trail length mechanism 30 further includes the ball screw mechanism 43 that translates rotation of the electric motor 42 to linear motion to thereby oscillate the oscillation unit 41. The ball screw mechanism 43 is disposed such that the threaded shaft 51 thereof has an axis extending in parallel with the axis 42c of the electric motor 42, so that the electric motor 42 and the ball screw mechanism 43 can be compactly disposed. The steering inertia can thus be reduced.

The variable trail length mechanism 30 further includes the speed reducer 45 that transmits rotation of the electric motor 42 to the ball screw mechanism 43 with reduced speed and the lock mechanism 46 that restricts rotation of the electric motor 42 and that is disposed upstream of the speed reducer 45 in the path along which the rotation of the electric motor 42 is transmitted. The foregoing arrangement results in the rotation transmitted from the oscillation unit 41 side to the electric motor 42 via the ball screw mechanism 43 and the speed reducer 45 building up speed, so that torque transmitted from the oscillation unit 41 side to the electric motor 42 via the speed reducer 45 is small. Thus, the lock mechanism 46 disposed upstream of the speed reducer 45, even with a compact configuration, can still restrict rotation of the electric motor 42 and operation of the variable trail length mechanism 30 can be easily restricted.

Additionally, the lock mechanism 46, because having an axis coaxial with the axis 42c of the electric motor 42, can be built compactly.

The variable trail length mechanism 30 further includes the linkage mechanism 47 that connects the ball screw mechanism 43 with the oscillation unit 41 and the steering rotation unit 13. The steering rotation unit 13 includes the steering shaft 32 journaled by the head pipe 17 of the vehicle body frame 11, the top bridge 33 fixed to the upper end portion of the steering shaft 32, and the bottom member 34 fixed to the lower end portion of the steering shaft 32. The oscillation unit 41 is oscillatably supported via the oscillation shaft 48 disposed in the top bridge 33 and connected to the bottom member 34 via the linkage mechanism 47. This arrangement allows the oscillation unit 41 that is oscillatable about the oscillation shaft 48 of the top bridge 33 to be oscillated via the linkage mechanism 47 connected with the bottom member 34. Thus, the oscillation unit 41 can be oscillated by a compact structure to thereby change the trail length t.

Additionally, the oscillation unit 41 includes the bottom bridge 49 that connects the left and right front forks 25L and 25R and the linkage mechanism 47 is connected with the bottom bridge 49. This arrangement enables a compact structure to connect the linkage mechanism 47 with the oscillation unit 41 using the bottom bridge 49 that increases stiffness of the front forks 25L and 25R.

Additionally, the bracket 36 that connects the top bridge 33 of the steering rotation unit 13 with the bottom member 34 is disposed anterior to the head pipe 17. The electric motor 42 is supported on the vehicle body 10 via the bracket 36. Specifically, the bracket 36, because connecting the top bridge 33 with the bottom member 34 at a position anterior to the head pipe 17, is close to the steering axis Cs. The electric motor 42 thus can be disposed close to the steering axis Cs, so that the steering inertia can be reduced.

Additionally, in accordance with the first embodiment, the vehicle 1 includes the vehicle body 10, the front wheel 2 that is disposed anterior to the vehicle body 10 and is steerable about the steering axis Cs, and the front forks 25L and 25R that support the front wheel 2. The vehicle body 10 includes the vehicle body frame 11 and the steering rotation unit 13 that is supported on the vehicle body frame 11 and that rotates about the steering axis Cs. The vehicle 1 further includes the variable trail length mechanism 30 that varies the trail length t of the front wheel 2. The variable trail length mechanism 30 includes the oscillation shaft 48 that extends in the vehicle width direction and connects the front forks 25L and 25R oscillatably with the steering rotation unit 13. The oscillation shaft 48 is disposed, in the vehicle side elevational view, to be aligned with the fork axis 25a of the front forks 25L and 25R. Thus, because the front forks 25L and 25R oscillate about the oscillation shaft 48 disposed to be aligned with the fork axis 25a, the inertia weight can be reduced when the trail length t is varied by oscillating the front forks 25L and 25R. Thus, the trail length t can be easily varied using the variable trail length mechanism 30.

The oscillation shaft 48 is disposed at the upper end portions of the front forks 25L and 25R and thus can be compactly disposed through an effective use of a space at the upper end portions of the front forks 25L and 25R. Additionally, the foregoing arrangement eliminates the need for a space superior to the oscillation shaft 48, in which the front forks 25L and 25R can be oscillated. This enhances a degree of freedom in disposing parts.

The front forks 25L and 25R are provided with the fork caps 25d that close the upper surfaces of the front forks 25L and 25R and the oscillation shaft 48 is disposed in the fork caps 25d. Thus, the oscillation shaft 48 can be provided using a simple structure that uses the fork caps 25d.

The steering rotation unit 13 includes the steering shaft 32 journaled by the head pipe 17 of the vehicle body frame 11, the top bridge 33 fixed to the upper end portion of the steering shaft 32, and the bottom member 34 fixed to the lower end portion of the steering shaft 32. The variable trail length mechanism 30 includes the electric motor 42 and the linkage mechanism 47 that connects the front forks 25L and 25R with the bottom member 34 and that oscillates the front forks 25L and 25R using the driving force of the electric motor 42. The oscillation shaft 48 is supported by the top bridge 33. This arrangement allows the front forks 25L and 25R that are supported by the oscillation shaft 48 of the top bridge 33 to be oscillated via the linkage mechanism 47 connected with the bottom member 34. Thus, the trail length t can be changed by oscillating the front forks 25L and 25R using a compact structure.

Additionally, the front forks 25L and 25R are an electronic control suspension capable of changing an axial length thereof and the vehicle 1 includes the control apparatus 83 that drives the electronic control suspension so as to minimize changes in the vehicle height corresponding to the change in the vehicle height by the operation of the variable trail length mechanism 30. Thus, the change in vehicle height can be minimized even when the trail length t is changed by the variable trail length mechanism 30. In addition, when the vehicle 1 is stationary, the vehicle height may be lowered using the electronic control suspension to thereby improve a property with which the operator (rider) can put both feet on the ground.

Additionally, in accordance with the first embodiment, the vehicle 1 includes the vehicle body 10 and the front wheel 2 that is disposed anterior to the vehicle body 10 and is steerable about the steering axis Cs. The vehicle body 10 includes the vehicle body frame 11 and the steering rotation unit 13 that is supported on the vehicle body frame 11 and that rotates about the steering axis Cs. The vehicle 1 further includes the variable trail length mechanism 30 that varies the trail length t of the front wheel 2. The variable trail length mechanism 30 includes the oscillation unit 41 that is connected with the steering rotation unit 13 so as to be oscillatable in the fore-aft direction and that supports the front wheel 2 and the torsion reduction portion 102 that reduces torsion of the oscillation unit 41 in the vehicle width direction through the oscillation unit 41 combined with the steering rotation unit 13 under the condition in which the trail length t is changed such that the front wheel 2 is disposed at a rearmost position. The foregoing arrangement allows the torsion of the oscillation unit 41 in the vehicle width direction to be reduced through the oscillation unit 41 combined with the steering rotation unit 13 under the ordinary traveling state in which the vehicle 1 travels with the trail length t changed such that the front wheel 2 is disposed at the rearmost position, so that the oscillation unit 41 can be prevented from being deformed in the vehicle width direction during traveling. Thus, stiffness of the front wheel 2 surrounding structure during the ordinary traveling state can be enhanced.

Additionally, the torsion reduction portion 102 includes the fitted portion 90 disposed in the steering rotation unit 13 and the fitting portion 100 that is disposed in the oscillation unit 41 and that can be fitted in the fitted portion 90. The fitting portion 100 may be fitted in the fitted portion 90 under the condition in which the trail length t is changed such that the front wheel 2 is disposed at the rearmost position. Through the foregoing arrangement, during the ordinary traveling state in which the vehicle 1 travels with the trail length t changed such that the front wheel 2 is disposed at the rearmost position, the fitting portion 100 of the oscillation unit 41 fits in the fitted portion 90 of the steering rotation unit 13 to thereby prevent the oscillation unit 41 from being deformed in the vehicle width direction during traveling. Thus, the stiffness of the front wheel 2 surrounding structure during the ordinary traveling state can be enhanced.

Additionally, the oscillation unit 41 includes the bottom bridge 49 that connects the pair of left and right front forks 25L and 25R that support the front wheel 2 and the fitting portion 100 is disposed in the bottom bridge 49. This arrangement permits use of a simple structure of the bottom bridge 49 that enhances stiffness of the front forks 25L and 25R in disposing the fitting portion 100.

The steering rotation unit 13 includes the steering shaft 32 journaled by the head pipe 17 of the vehicle body frame 11, the top bridge 33 fixed to the upper end portion of the steering shaft 32, and the bottom member 34 fixed to the lower end portion of the steering shaft 32. The fitted portion 90 is disposed in the bottom member 34. This arrangement permits use of a simple structure of the bottom member 34 of the steering rotation unit 13 in disposing the fitted portion 90. Additionally, because the bottom member 34 rotates integrally with the oscillation unit 41, the fitting portion 100 can be fitted into the fitted portion 90 with a simple structure.

The fitting portion 100, because having the left and right protrusion lateral surfaces 100c, 100c that abut on the fitted portion 90 in the vehicle width direction, can effectively reduce deformation of the oscillation unit 41 in the vehicle width direction.

The fitting portion 100 and the fitted portion 90 are configured as a set of a protrusion and a recess. The protrusion lateral surfaces 100c, 100c that assume the lateral surfaces in the vehicle width direction of the protrusion are inclined such that the protrusion has the tapering leading end 100d. Thus, the inclination of the protrusion lateral surfaces 100c, 100c serve as a guide for the protrusion to fit in the fitted portion 90 as the recess, so that the protrusion can be easily fitted in the recess. Additionally, the fitting portion 100 is the protrusion protruding to the rear and the fitted portion 90 is the recess in which the protrusion fits. Thus, under a condition in which the trail length t has been changed such that the front wheel 2 is disposed at the rearmost position, the fitting portion 100 can be fitted in the fitted portion 90.

Second Embodiment

A second embodiment to which the present invention is applied will be described below with reference to FIG. 13. In the second embodiment, like or identical parts described in the first embodiment are denoted by like or identical reference symbols and descriptions therefor will be omitted.

The first embodiment has been described for the structure in which the electric motor 42, the ball screw mechanism 43, and the like oscillate the front forks 25L and 25R to thereby change the trail length t. The second embodiment will be described for another configuration for oscillating the front forks 25L and 25R.

Figure 13:
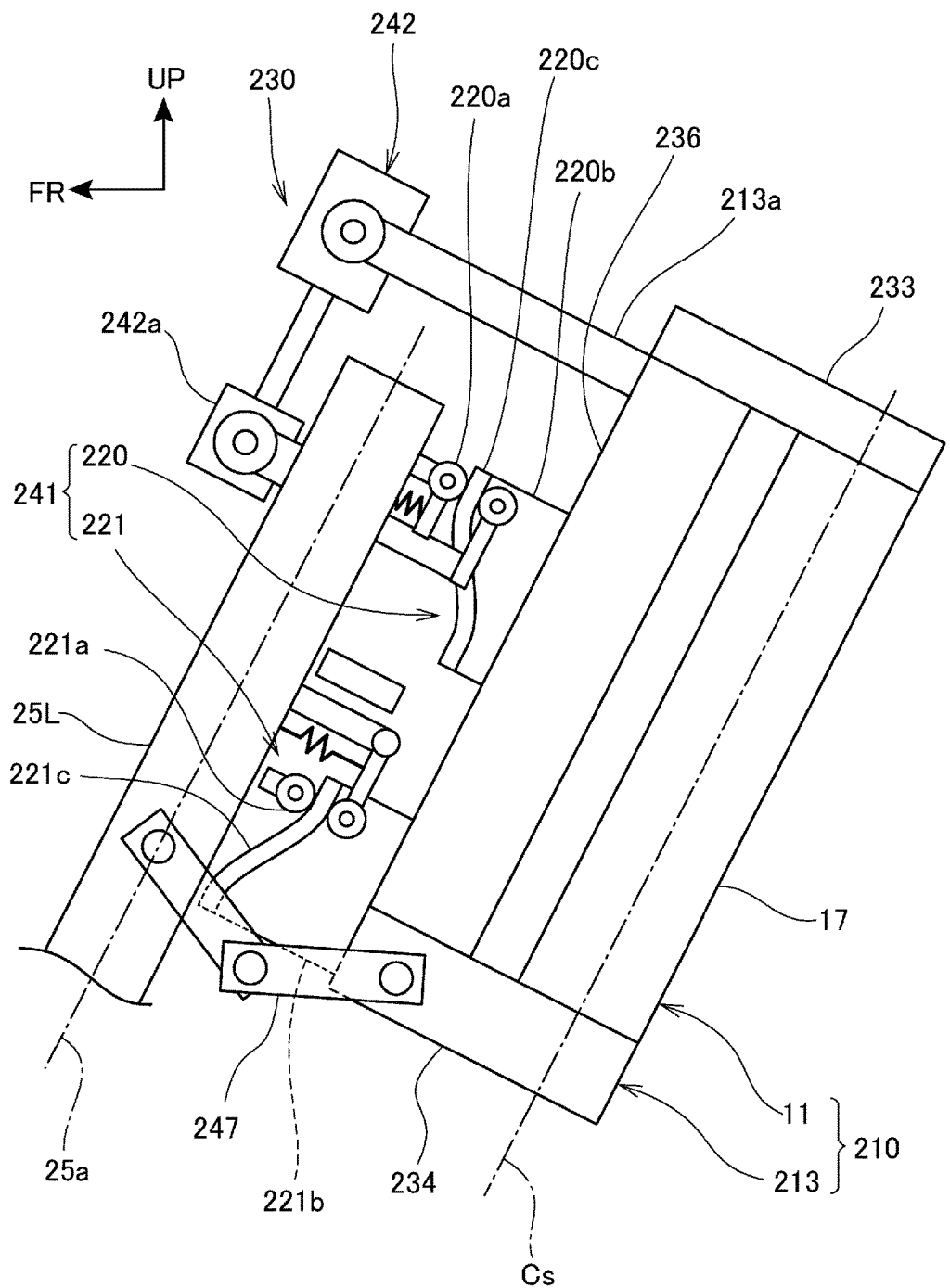
FIG. 13 is a left side elevational view depicting schematically a front portion of a vehicle according to a second embodiment.

FIG. 13 is a left side elevational view depicting schematically a front portion of a vehicle 1 according to the second embodiment.

A vehicle body 210 includes a vehicle body frame 11 and a steering rotation unit 213.

The steering rotation unit 213 is rotatably supported by a head pipe 17. The steering rotation unit 213 includes a top bridge 233, a steering shaft 32 (FIG. 9), and a bottom member 234. The steering rotation unit 213 rotates integrally about a steering axis Cs that is aligned with an axis of the steering shaft 32.

A bracket 236 that vertically connects the top bridge 233 with the bottom member 234 at a position anterior to the head pipe 17 is mounted on the steering rotation unit 213.

A variable trail length mechanism 230 includes an oscillation unit 241, a hydraulic actuator 242, and a link 247. The oscillation unit 241 is connected with the steering rotation unit 213 oscillatably in the fore-aft direction. The hydraulic actuator 242 serves as a drive source for oscillating the oscillation unit 241. The link 247 connects the bottom member 234 with the front forks 25L and 25R.

The front forks 25L and 25R have upper portions supported by the oscillation unit 241 and extend downwardly.

The oscillation unit 241 includes an upper guide portion 220 and a lower guide portion 221. The upper guide portion 220 is disposed at the upper end portions of the front forks 25L and 25R. The lower guide portion 221 is disposed on the front forks 25L and 25R at a position inferior to the upper guide portion 220.

The upper guide portion 220 includes an upper roller member 220a and an upper guide rail 220b. The upper roller member 220a is disposed on rear surfaces of the front forks 25L and 25R. The upper guide rail 220b is disposed on a front surface of the bracket 236. The upper guide rail 220b includes a rail portion 220c that extends vertically. The rail portion 220c extends, in a side elevational view, from an upper end downwardly toward the front and then extends downwardly and substantially vertically before extending downwardly toward the front up to a lower end.

The upper roller member 220a includes a pair of rollers that clamp the rail portion 220c from the front and rear. The upper roller member 220a moves in the vertical direction and the fore-aft direction along the rail portion 220c.

The lower guide portion 221 includes a lower roller member 221a and a lower guide rail 221b. The lower roller member 221a is disposed on the rear surfaces of the front forks 25L and 25R. The lower guide rail 221b is disposed on a front surface of a lower portion of the steering rotation unit 213. The lower guide rail 221b includes a rail portion 221c that extends vertically. The rail portion 221c extends, in the side elevational view, from an upper end downwardly toward the front and then extends substantially horizontally before extending again downwardly toward the front up to a lower end.

The lower roller member 221a includes a pair of rollers that clamp the rail portion 221c from the front and rear. The lower roller member 221a moves in the vertical direction and the fore-aft direction along the rail portion 221c.

The hydraulic actuator 242 is supported by a stay 213a that extends toward the front from an upper portion of the bracket 236 of the steering rotation unit 213. The hydraulic actuator 242 is disposed superior to the front forks 25L and 25R.

The hydraulic actuator 242 includes an actuating portion 242a. The actuating portion 242a extends downwardly and is connected with front surfaces of the upper end portions of the front forks 25L and 25R. The actuating portion 242a makes a vertical stroke motion.

The hydraulic actuator 242 receives hydraulic pressure supplied from, for example, a hydraulic generator in the vehicle body 210. Operation of the hydraulic actuator 242 is controlled by a control apparatus 83.

When the actuating portion 242a of the hydraulic actuator 242 operates, the upper roller member 220a and the lower roller member 221a move along the rail portion 220c and the rail portion 221c, respectively, so that the front forks 25L and 25R oscillate in the fore-aft direction with a position near the upper guide portion 220 and the lower guide portion 221 as a base point. This changes the trail length t and moves mounting portions of the front forks 25L and 25R downward, so that a change in vehicle height can be minimized even with the trail length t changed. This eliminates the electronic control suspension as that described in the first embodiment.

In the second embodiment, the hydraulic actuator 242 is supported by the steering rotation unit 213 of the vehicle body 210. This arrangement results in the hydraulic actuator 242 being close to the steering axis Cs, so that steering inertia can be reduced.

Third Embodiment

A third embodiment to which the present invention is applied will be described below with reference to FIG. 14. In the third embodiment, like or identical parts described in the first embodiment are denoted by like or identical reference symbols and descriptions therefor will be omitted.

The first embodiment has been described for the arrangement in which the front forks 25L and 25R oscillate about the oscillation shaft 48 disposed at the upper end portions of the front forks 25L and 25R. The third embodiment will be described for a configuration in which an oscillation shaft 348 is disposed inferior to the upper end portions of the front forks 25L and 25R.

Figure 14:
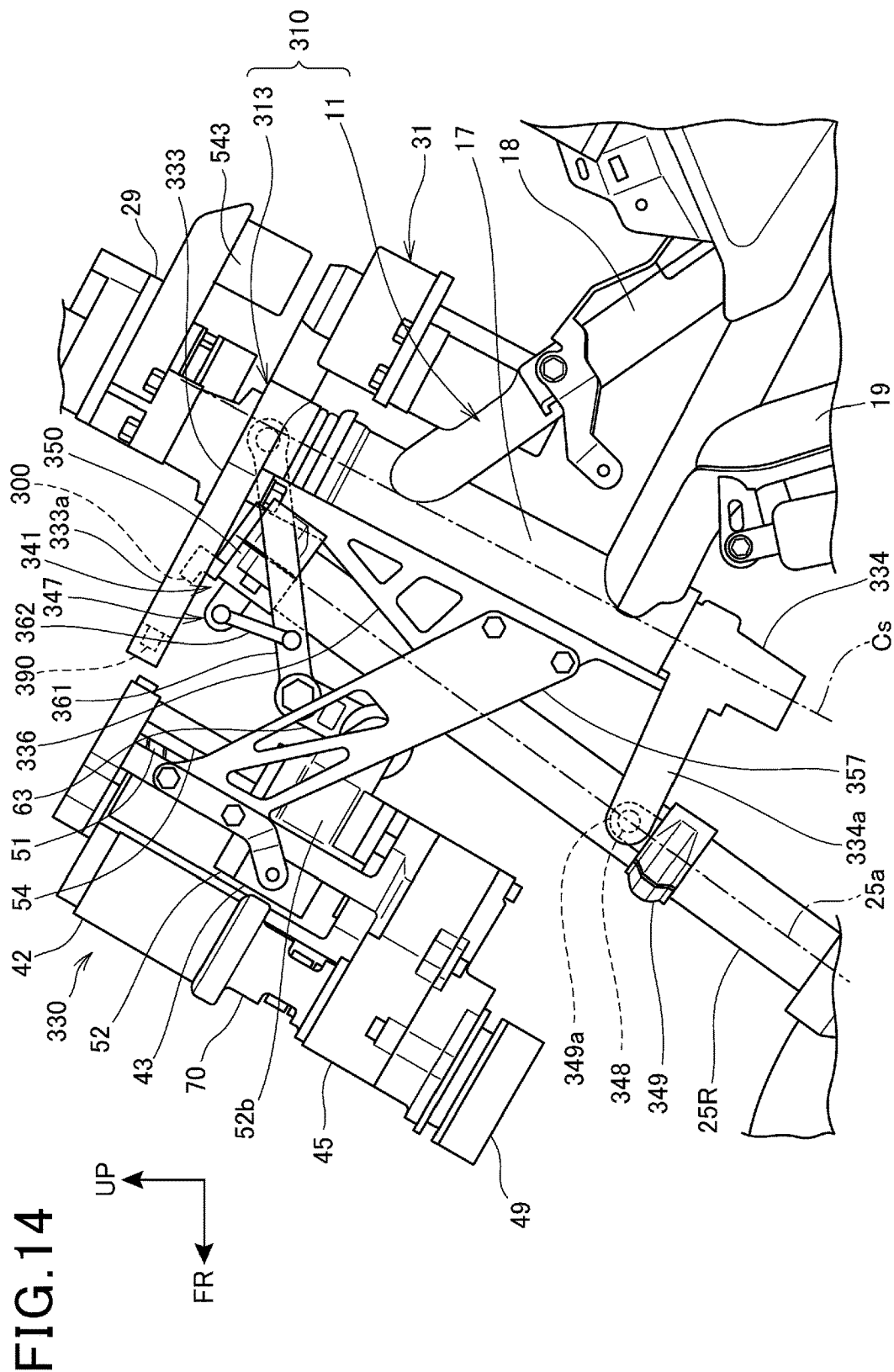
FIG. 14 is a left side elevational view depicting a front portion of a vehicle according to a third embodiment.

FIG. 14 is a left side elevational view depicting a front portion of a vehicle 1 according to a third embodiment.

A vehicle body 310 includes a vehicle body frame 11 and a steering rotation unit 313.

The steering rotation unit 313 is rotatably supported by a head pipe 17. The steering rotation unit 313 includes a top bridge 333, a steering shaft 32 (FIG. 9), and a bottom member 334. The steering rotation unit 313 rotates integrally about a steering axis Cs that is aligned with an axis of the steering shaft 32.

The steering rotation unit 313 includes a bracket 336 that vertically connects the top bridge 333 with the bottom member 334 at a position anterior to the head pipe 17.

The steering rotation unit 313 includes an oscillation shaft support portion 334a that extends toward the front from the bottom member 334.

A variable trail length mechanism 330 includes an oscillation unit 341, an electric motor 42, a ball screw mechanism 43, a speed reducer 45, a lock mechanism 46, and a linkage mechanism 347. The oscillation unit 341 is connected with the steering rotation unit 313 oscillatably in the fore-aft direction. The linkage mechanism 347 connects the ball screw mechanism 43 with the oscillation unit 341 and the steering rotation unit 313.

In the third embodiment, the electric motor 42, the ball screw mechanism 43, the speed reducer 45, and the lock mechanism 46 are disposed in substantially reverse order vertically relative to the configuration of the first embodiment.

The ball screw mechanism 43 is mounted on the bracket 336 via support pieces 357, 357. Specifically, the electric motor 42 is supported by the steering rotation unit 313 of the vehicle body 310 via, for example, the bracket 336.

The oscillation unit 341 includes the oscillation shaft 348 and a link connecting portion 350. The oscillation shaft 348 extends in the vehicle width direction and connects the front forks 25L and 25R oscillatably with the steering rotation unit 313. The link connecting portion 350 is disposed at the upper end portions of the front forks 25L and 25R and connected with the linkage mechanism 347.

The oscillation shaft 348 is supported at a front end portion of the oscillation shaft support portion 334a of the bottom member 334.

The linkage mechanism 347 includes a first link 361, a second link 362, and a third link 63. The first link 361 connects the top bridge 333 with the ball screw mechanism 43. The second link 362 connects the first link 361 with the link connecting portion 350 of the oscillation unit 341. The third link 63 connects the first link 361 with a moving portion 52b of the ball screw mechanism 43.

The front forks 25L and 25R are connected with each other in the vehicle width direction by a bottom bridge 349 disposed anterior to the bottom member 334.

The bottom member 334 includes an oscillation shaft connecting portion 349a disposed at a position overlapping a fork axis 25a in the side elevational view. The oscillation shaft 348 is passed through the oscillation shaft connecting portion 349a of the bottom member 334 to thereby be connected with the bottom member 334.

When the electric motor 42 is driven, the oscillation unit 341 oscillates via the linkage mechanism 347 and the link connecting portion 350 oscillates in the fore-aft direction about the oscillation shaft 348. This causes the front forks 25L and 25R to oscillate in the fore-aft direction about the oscillation shaft 348 that is disposed to overlap the fork axis 25a in the side elevational view, so that a trail length t is changed.

In the third embodiment, the steering rotation unit 313 includes the steering shaft 32 (FIG. 9) journaled by the head pipe 17 of the vehicle body frame 11, the top bridge 333 fixed at the upper end portion of the steering shaft 32, and the bottom member 334 fixed at the lower end portion of the steering shaft 32, and the oscillation shaft 348 is disposed at a position that overlaps the fork axis 25a and that is closer to the bottom member 334 than to the top bridge 333 in the side elevational view. This arrangement causes the front forks 25L and 25R to oscillate about the oscillation shaft 348 disposed at the position closer to the bottom member 334, so that a change in vehicle height when the trail length t is changed by the variable trail length mechanism 330 can be minimized.

Additionally, the bottom bridge 349 connects the pair of left and right front forks 25L and 25R each other and the oscillation shaft 348 is disposed on the bottom bridge 349 at the position overlapping the fork axis 25a in the side elevational view. This arrangement enables the oscillation shaft 348 to be disposed in a simple structure using the bottom bridge 349 that improves stiffness of the front forks 25L and 25R.

In addition, the oscillation unit 341 includes a fitting portion 300 that protrudes to the front from the link connecting portion 350.

The steering rotation unit 313 includes a forward extension portion 333a that extends forward relative to the front forks 25L and 25R. The forward extension portion 333a includes a fitted portion 390 disposed anterior to the fitting portion 300.

The fitting portion 300 has a protrusion having, for example, a forwardly protruding shape identical to the shape of the fitting portion 100 in the first embodiment. The fitted portion 390 is a recess having a shape identical to the shape of the fitted portion 90 in the first embodiment.

When the "ordinary state" is set as a result of the upper portions of the front forks 25L and 25R oscillating forward from the "trail length changed state" of FIG. 14 about the oscillation shaft 348, the fitting portion 300 fits into the fitted portion 390. This enhances stiffness of the structure surrounding a front wheel 2 in the "ordinary state."

Fourth Embodiment

A fourth embodiment to which the present invention is applied will be described below with reference to FIG. 15. In the fourth embodiment, like or identical parts described in the first embodiment are denoted by like or identical reference symbols and descriptions therefor will be omitted.

The first embodiment has been described for the arrangement in which the front forks 25L and 25R oscillate about the oscillation shaft 48 disposed at the upper end portions of the front forks 25L and 25R. The fourth embodiment will be described for a configuration in which an oscillation shaft 348 is disposed inferior to the upper end portions of the front forks 25L and 25R and the front forks 25L and 25R are oscillated using a drive source different from the electric motor 42.

Figure 15:
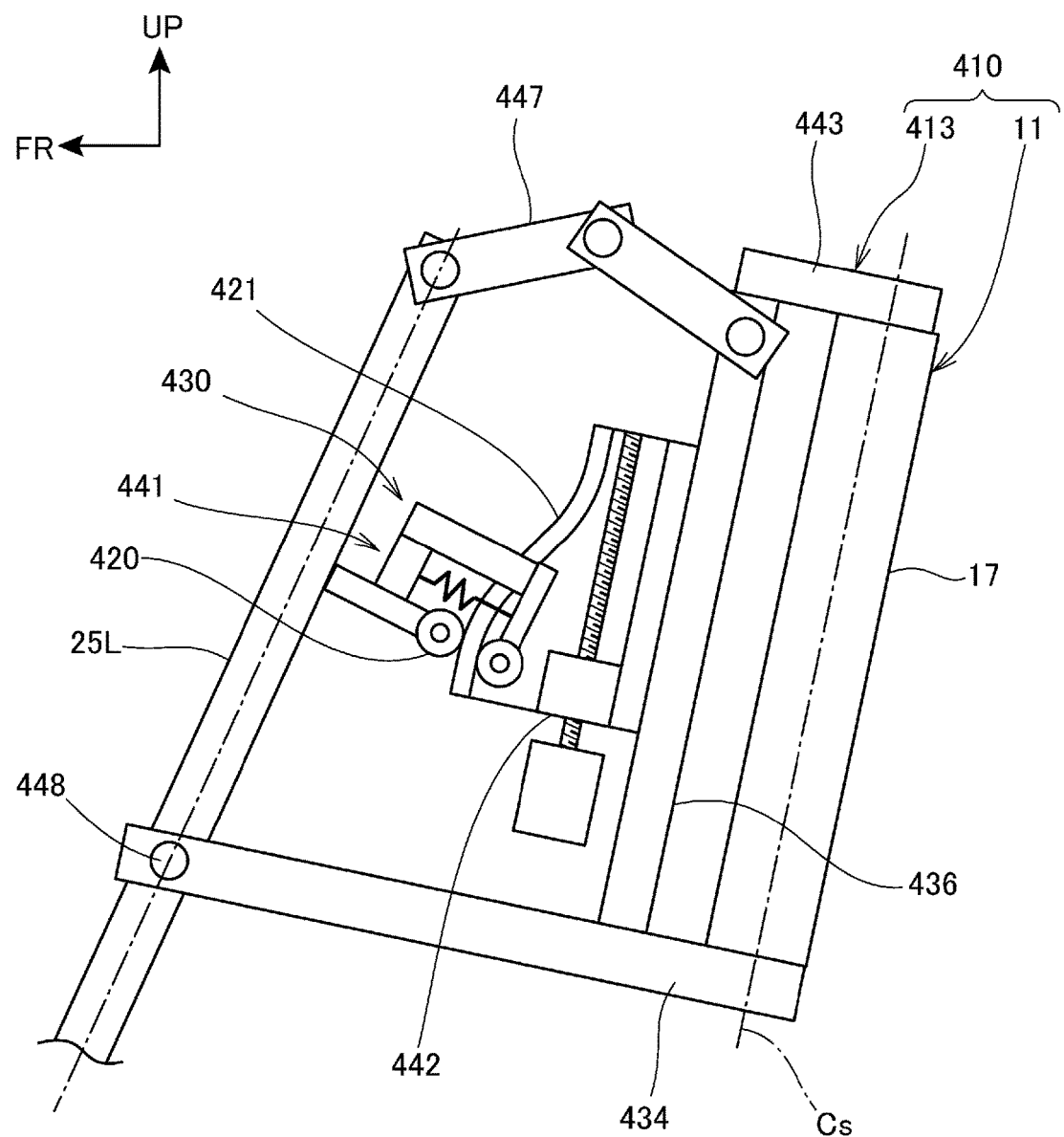
FIG. 15 is a left side elevational view depicting schematically a front portion of a vehicle according to a fourth embodiment.

FIG. 15 is a left side elevational view depicting schematically a front portion of a vehicle 1 according to the fourth embodiment.

A vehicle body 410 includes a vehicle body frame 11 and a steering rotation unit 413.

The steering rotation unit 413 is rotatably supported by a head pipe 17. The steering rotation unit 413 includes a top bridge 433, a steering shaft 32 (FIG. 9), and a bottom member 434. The steering rotation unit 413 rotates integrally about a steering axis Cs that is aligned with an axis of the steering shaft 32.

The steering rotation unit 413 includes a bracket 436 that vertically connects the top bridge 433 with the bottom member 434 at a position anterior to the head pipe 17.

A variable trail length mechanism 430 includes a drive source 442, an oscillation unit 441, an oscillation shaft 448, and a link 447. The oscillation unit 441 is connected with the front forks 25L and 25R and is oscillated in the fore-aft direction by a driving force of the drive source 442. The oscillation shaft 448 extends in the vehicle width direction and connects the front forks 25L and 25R oscillatably with the steering rotation unit 413. The link 447 connects upper end portions of the front forks 25L and 25R with the steering rotation unit 413.

The drive source 442 is a screw mechanism driven by a motor and displaced linearly in the vertical direction. The drive source 442 is fixed to the bracket 436.

The oscillation unit 441 includes a roller member 420 and a guide rail 421. The roller member 420 is disposed posterior to the front forks 25L and 25R. The guide rail 421 is moved in the vertical direction by the drive source 442.

The oscillation unit 441 and the drive source 442 are disposed at a position superior to the bottom member 434 and the oscillation shaft 448 and posterior to the upper portions of the front forks 25L and 25R. The oscillation shaft 448 is disposed, in the vehicle side elevational view, at a position overlapping an fork axis 25a.

The guide rail 421 extends, in the side elevational view, from an upper end downwardly toward the front and then extends substantially horizontally before extending again downwardly toward the front up to a lower end.

The roller member 420 includes a pair of rollers that clamp the guide rail 421 from the front and rear. The guide rail 421 moves in the vertical direction under a condition of being clamped between the two rollers of the roller member 420.

When the drive source 442 is energized by a control apparatus 83 (FIG. 11), the guide rail 421 moves vertically and the roller member 420 follows the shape of the guide rail 421 to thereby oscillate in the fore-aft direction. This causes the front forks 25L and 25R to oscillate in the fore-aft direction integrally with the guide rail 421 about the oscillation shaft 448, so that a trail length t is changed.

Figure 16:
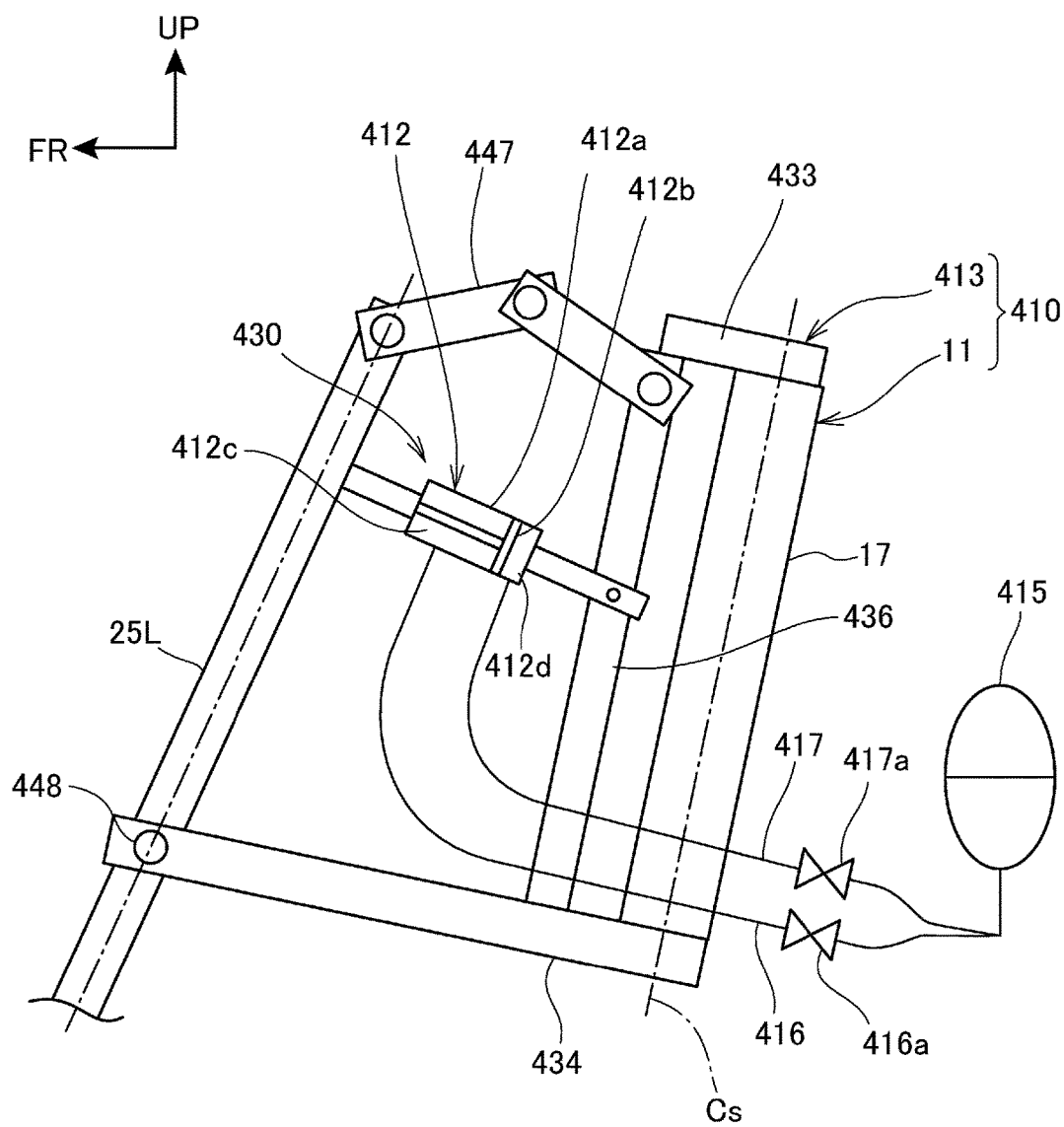
FIG. 16 is a side elevational view depicting a modification of the fourth embodiment.

FIG. 16 is a side elevational view depicting a modification of the fourth embodiment.

As depicted in FIG. 16, a pneumatic actuator 412 may be provided as a drive source, in place of the drive source 442 and the oscillation unit 441 depicted in FIG. 15.

The actuator 412 extends in the fore-aft direction to thereby connect the upper portions of the front forks 25L and 25R with the steering rotation unit 413. A pneumatic pressure source 415 disposed in the vehicle body 410 supplies the actuator 412 with air pressure.

The actuator 412 includes a cylinder 412a and a piston 412b disposed in the cylinder 412a. The piston 412b separates the cylinder 412a into an anterior chamber 412c and a posterior chamber 412d.

The pneumatic pressure source 415 is connected with the anterior chamber 412c by a first air passage 416 and with the posterior chamber 412d by a second air passage 417. The first air passage 416 and the second air passage 417 are provided with a valve 416a and a valve 417a, respectively. The valve 416a and the valve 417a are each opened and closed by the control apparatus 83.

When air pressure is supplied to the posterior chamber 412d, the piston 412b moves forward and an actuating portion of the piston 412b pushes the front forks 25L and 25R forward. This causes the upper portions of the front forks 25L and 25R to oscillate in the forward direction about the oscillation shaft 448, thus setting the vehicle 1 in the "ordinary state."

When air pressure is supplied to the anterior chamber 412c, the piston 412b moves backward and the actuating portion of the piston 412b pulls the front forks 25L and 25R forward. This causes the upper portions of the front forks 25L and 25R to oscillate in the backward direction about the oscillation shaft 448, thus setting the vehicle 1 in the "trail length changed state."

Fifth Embodiment

A fifth embodiment to which the present invention is applied will be described below with reference to FIG. 17. In the fifth embodiment, like or identical parts described in the first embodiment are denoted by like or identical reference symbols and descriptions therefor will be omitted.

The first embodiment has been described for the arrangement in which the fitting portion 100 and the fitted portion 90 are each disposed at the center in the vehicle width. The fifth embodiment will be described for another exemplary arrangement of the fitting portion and the fitted portion.

Figure 17:
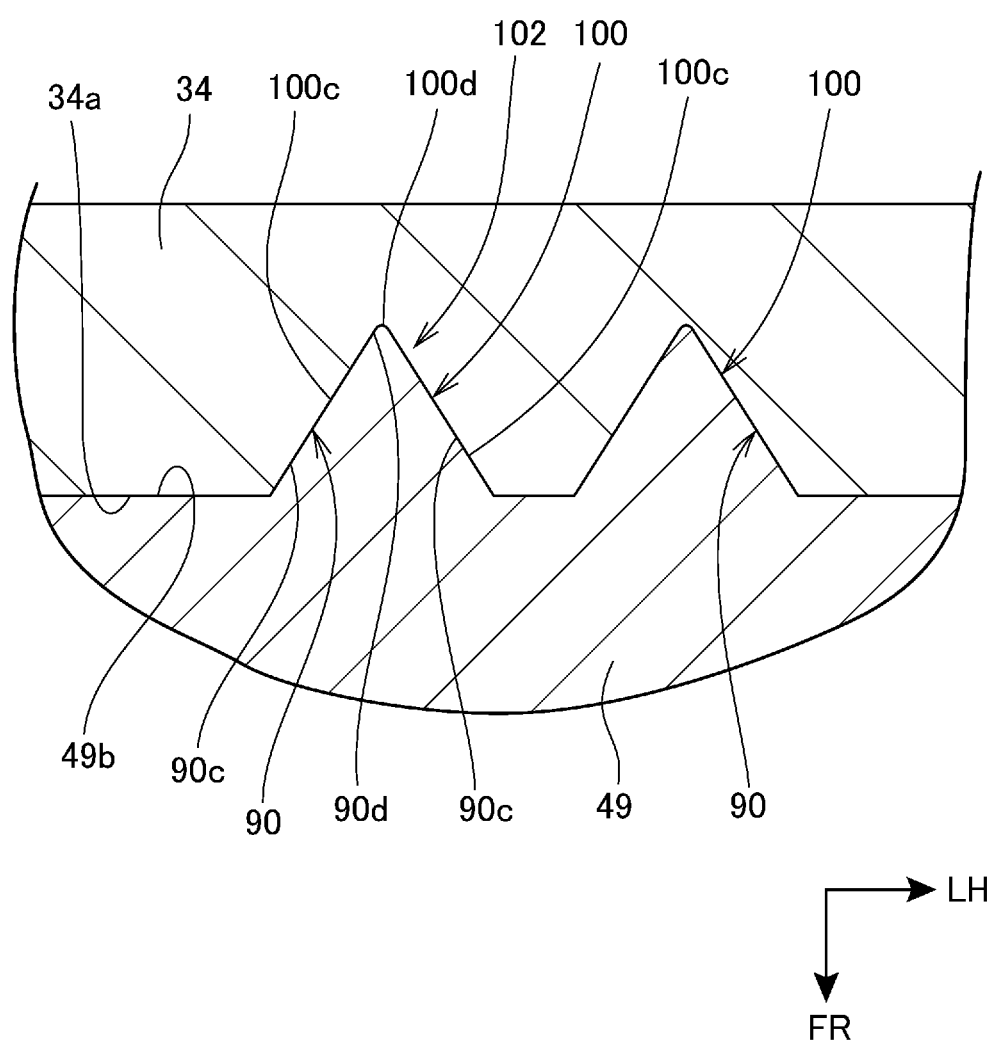
FIG. 17 is a cross-sectional view taken along line XII-XII in FIG. 6 according to a fifth embodiment.

FIG. 17 is a cross-sectional view taken along line XII-XII in FIG. 6 according to the fifth embodiment.

As depicted in FIG. 17, a possible arrangement may include a plurality of protrusions and recesses arrayed in the vehicle width direction, each pair of one protrusion and one recess constituting a pair of a fitting portion 100 and a fitted portion 90.

Alternatively, the fitting portion 100 may have a leading end 100d formed into a flat surface extending in parallel with a rear surface 49b of a bottom bridge 49, to thereby be formed into a trapezoid. In this case, the fitted portion 90 may have a bottom portion 90d formed into a flat surface to thereby be formed into a trapezoid.

Alternatively, the fitting portion 100 may be formed into a conical shape that protrudes toward the rear so as to have a tapering leading end. In this case, the fitted portion 90 is formed into a conical recess.

Alternatively, the fitted portion 90 in a bottom member 34 may be a protrusion protruding to the front and the fitting portion 100 of the bottom bridge 49 may be a recess in which the protrusion fits.

Still alternatively, the fitting portion 100 may be configured as a member separate from the bottom bridge 49 and configured to be removable with respect to the bottom bridge 49. In this case, the bottom bridge 49 may be formed of metal and the fitting portion 100 may be formed of a material (e.g., resin) different from the material of the bottom bridge 49.

Similarly, the fitted portion 90 may be configured as a member separate from the bottom member 34 and configured to be removable with respect to the bottom member 34. In this case, the bottom member 34 may be formed of metal and the fitted portion 90 may be formed of a material (e.g., resin) different from the material of the bottom member 34.

Figure 18:
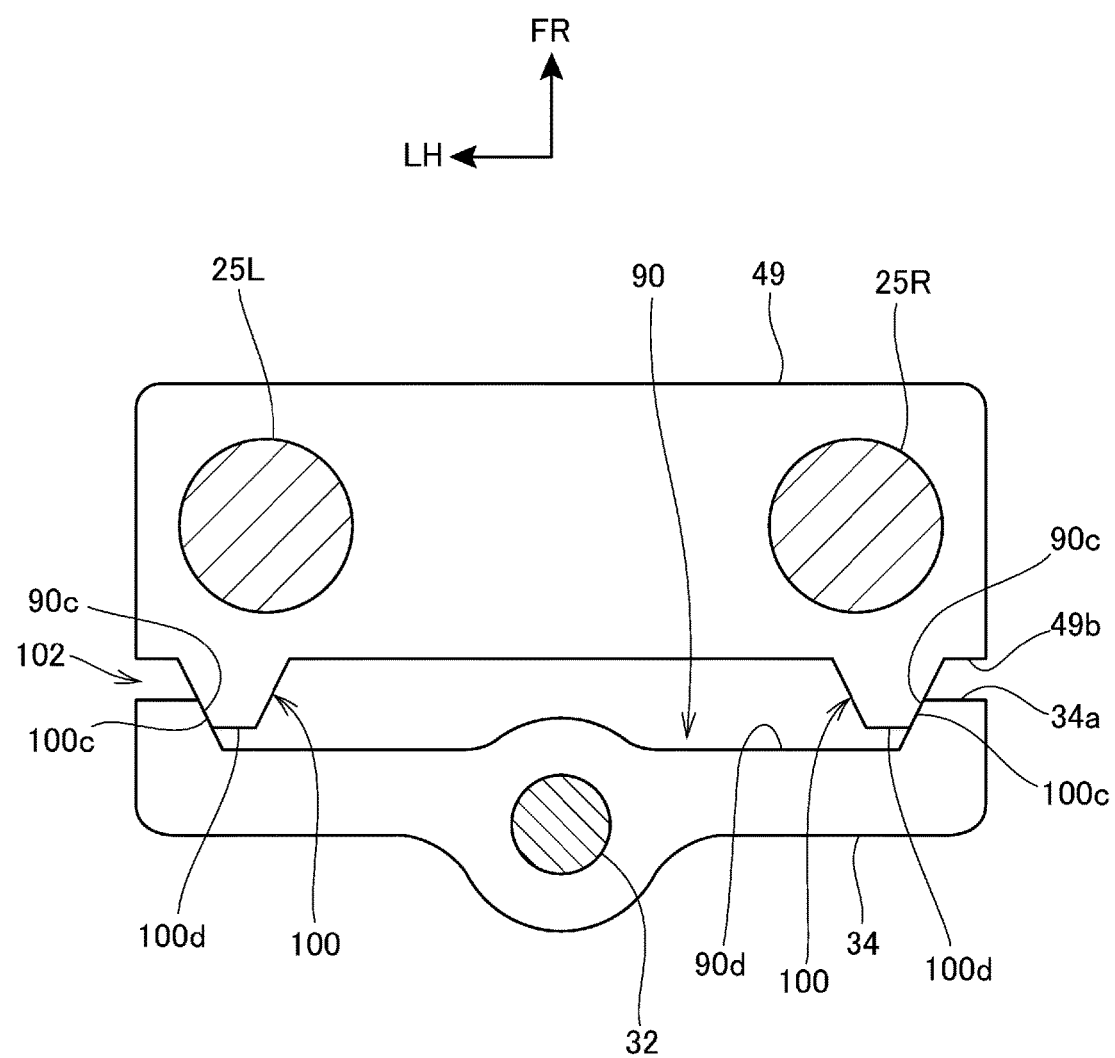
FIG. 18 is a schematic view depicting a variation of shapes of a fitting portion and a fitted portion.
Figure 19:
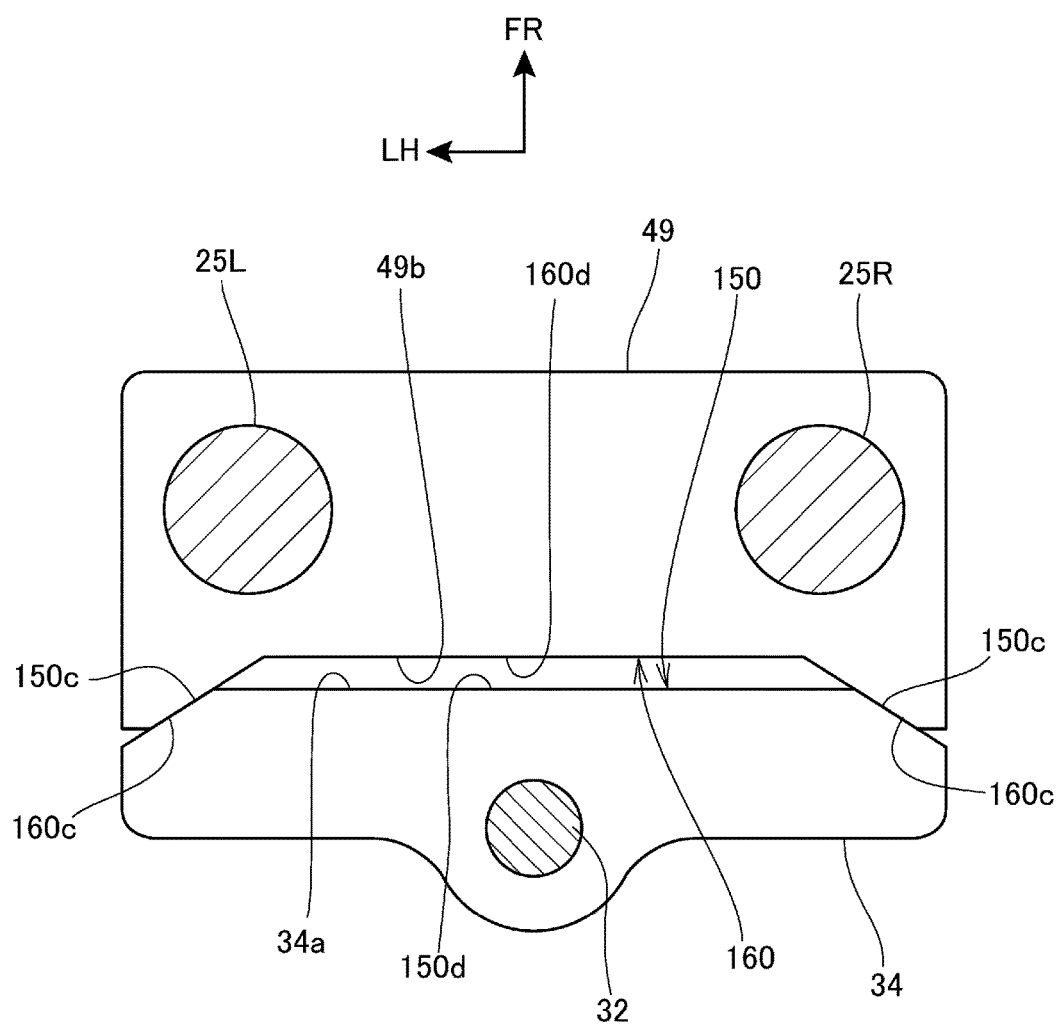
FIG. 19 is a schematic view depicting a variation of shapes of the fitting portion and the fitted portion.

FIGS. 18 and 19 are each a schematic view depicting a variation of shapes of the fitting portion 100 and the fitted portion 90. FIGS. 18 and 19 are each a view in the axial direction of the steering shaft 32.

As depicted in FIG. 18, two fitting portions 100, 100 may be formed on both lateral end portions of the rear surface 49b of the bottom bridge 49 and one fitted portion 90 may be formed in the front surface 34a of the bottom member 34. In the example depicted in FIG. 18, the fitted portion 90 is formed to extend over a wide range between both end portions of the front surface 34a in the vehicle width direction. The fitting portions 100 are configured such that protrusion lateral surfaces 100c on the outside in the vehicle width direction of the respective fitting portions 100 fit in respective recess lateral surfaces 90c, 90c of the fitted portion 90. Additionally, in the example depicted in FIG. 18, under a condition in which the fitting portions 100, 100 fit in the fitted portion 90, a gap is formed between each of the leading ends 100d and the bottom portion 90d and between the rear surface 49b and the front surface 34a.

Reference is made to FIG. 19. An arrangement may be possible in which the front surface 34a of the bottom member 34 may generally be defined as a fitting portion 150 as a forwardly protruding protrusion and a fitted portion 160 as a recess in which the fitting portion 150 fits may be formed in the rear surface 49b of the bottom bridge 49.

The fitting portion 150 has protrusion lateral surfaces 150c, 150c that are inclined so that the fitting portion 150 has a tapering leading end 150d.

The fitted portion 160 has recess lateral surfaces 160c, 160c in which the protrusion lateral surfaces 150c, 150c fit. Under a condition in which the fitting portion 150 fits in the fitted portion 160, a gap is formed between the leading end 150d of the fitting portion 150 and a bottom portion 160d of the fitted portion 160.

While the present invention has been particularly described with reference to various embodiments, it will be understood that the first to fifth embodiments are not intended to limit the present invention.

While the first to fifth embodiments have been described as applied to a motorcycle, the invention is applicable to not only the motorcycle, but also three-wheel saddled vehicles having two front or rear wheels, four-or-more-wheel saddled vehicles, and scooter and related types of saddled vehicles.

DESCRIPTION OF REFERENCE SYMBOLS

1 Vehicle
2 Front wheel
10, 210, 310 Vehicle body
11 Vehicle body frame
13, 313, 413 Steering rotation unit
17 Head pipe
25L, 25R Front fork
25a Fork axis (front fork axis)
25d Fork cap
30, 330, 430 Variable trail length mechanism
32 Steering shaft
33, 333, 433 Top bridge
34, 334, 434 Bottom member
42 Electric motor (drive source)
47 Linkage mechanism
48, 348, 448 Oscillation shaft
83 Control apparatus
349 Bottom bridg
Cs Steering axis
T Trail length

The invention claimed is:

1. A vehicle including a vehicle body, a front wheel that is disposed anterior to the vehicle body and that is steerable about a steering axis, and a front fork that supports the front wheel, the vehicle body including a vehicle body frame and a steering rotation unit that is supported on the vehicle body frame and that rotates about the steering axis, the vehicle comprising:
   a variable trail length mechanism that varies a trail length of the front wheel, the variable trail length mechanism including an oscillation shaft that extends in a vehicle width direction to thereby connect the front fork oscillatably with the steering rotation unit,
   wherein the oscillation shaft is disposed at a position overlapping an axis of the front fork in a vehicle side elevational view,
   wherein the steering rotation unit includes a steering shaft journaled by a head pipe of the vehicle body frame, a top bridge fixed to an upper end portion of the steering shaft, and a bottom member fixed to a lower end portion of the steering shaft, and
   wherein the oscillation shaft is disposed at, in a side elevational view, a position overlapping the axis of the front fork and closer to the bottom member than to the top bridge.

2. The vehicle according to claim 1, wherein the oscillation shaft is disposed at an upper end portion of the front fork.

3. The vehicle according to claim 2, wherein the front fork has a fork cap that closes an upper surface of the front fork, and
   wherein the oscillation shaft is disposed in the fork cap.

4. The vehicle according to any one of claim 1, wherein the steering rotation unit includes a steering shaft journaled by a head pipe of the vehicle body frame, a top bridge fixed to an upper end portion of the steering shaft, and a bottom member fixed to a lower end portion of the steering shaft,
   wherein the variable trail length mechanism includes a drive source and a linkage mechanism that connects the front fork with the bottom member and that oscillates the front fork through a driving force of the drive source, and
   wherein the oscillation shaft is supported by the top bridge.

5. The vehicle according to claim 1, further comprising:
   a bottom bridge that connects a left and right pair of the front forks, wherein the oscillation shaft is disposed in the bottom bridge at a position overlapping the axis of the front fork in a side elevational view.

6. The vehicle according to any one of claim 1, wherein the front fork constitutes an electronic control suspension capable of changing an axial length of the front fork, the vehicle further comprising:
   a control apparatus that drives the electronic control suspension so as to minimize a change in a vehicle height corresponding to the change in the vehicle height by an operation of the variable trail length mechanism.

7. A vehicle including a vehicle body, a front wheel that is disposed anterior to the vehicle body and that is steerable about a steering axis, and a front fork that supports the front wheel, the vehicle body including a vehicle body frame and a steering rotation unit that is supported on the vehicle body frame and that rotates about the steering axis, the vehicle comprising:

a variable trail length mechanism that varies a trail length of the front wheel, the variable trail length mechanism including an oscillation shaft that extends in a vehicle width direction to thereby connect the front fork oscillatably with the steering rotation unit, wherein the oscillation shaft is disposed at a position overlapping an axis of the front fork in a vehicle side elevational view, and wherein the front fork constitutes an electronic control suspension capable of changing an axial length of the front fork, the vehicle further comprising:

a control apparatus that drives the electronic control suspension so as to minimize a change in a vehicle height corresponding to the change in the vehicle height by an operation of the variable trail length mechanism.

* * * * *